June 28, 1932.  B. M. SHIPLEY  1,865,147
CASH REGISTER
Filed Jan. 19, 1924   15 Sheets-Sheet 1

Inventor
Bernis M. Shipley
By Carl Beust
Henry E. Stauffer
His Attorneys

June 28, 1932.  B. M. SHIPLEY  1,865,147
CASH REGISTER
Filed Jan. 19, 1924  15 Sheets-Sheet 2
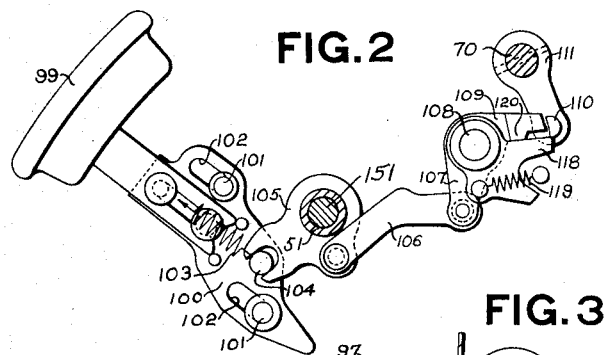
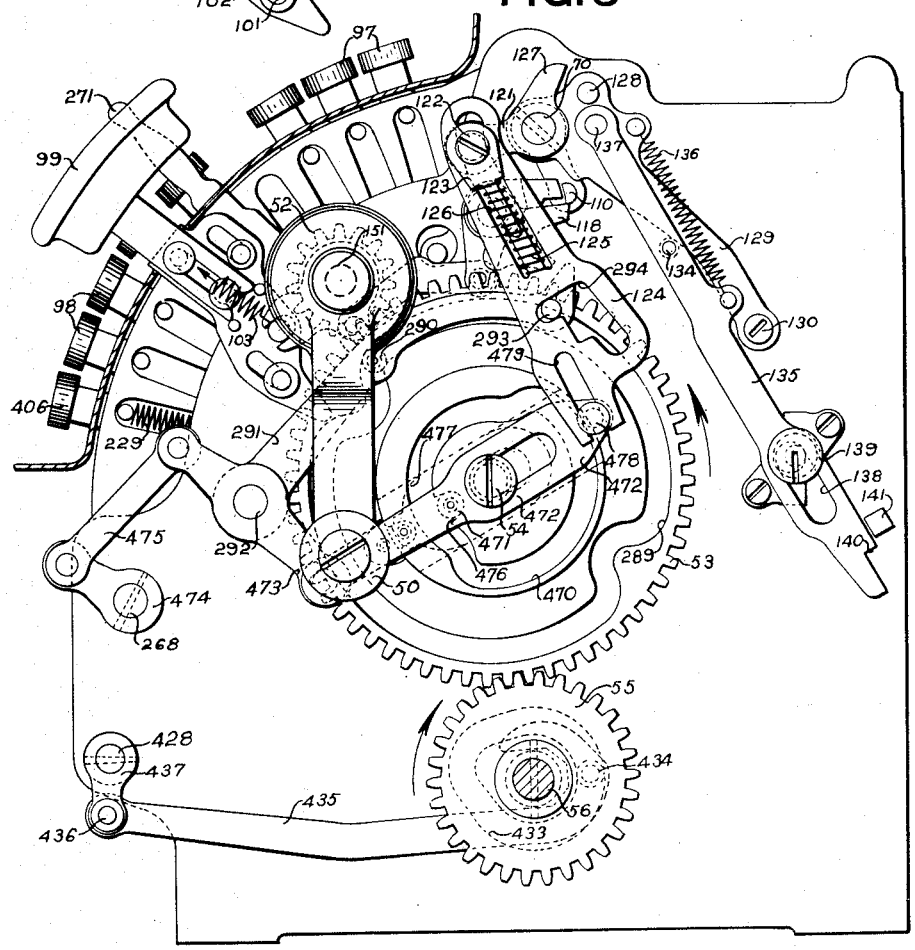
Inventor
Bernis M. Shipley
By Carl Benst
Henry E. Stauffer
His Attorneys

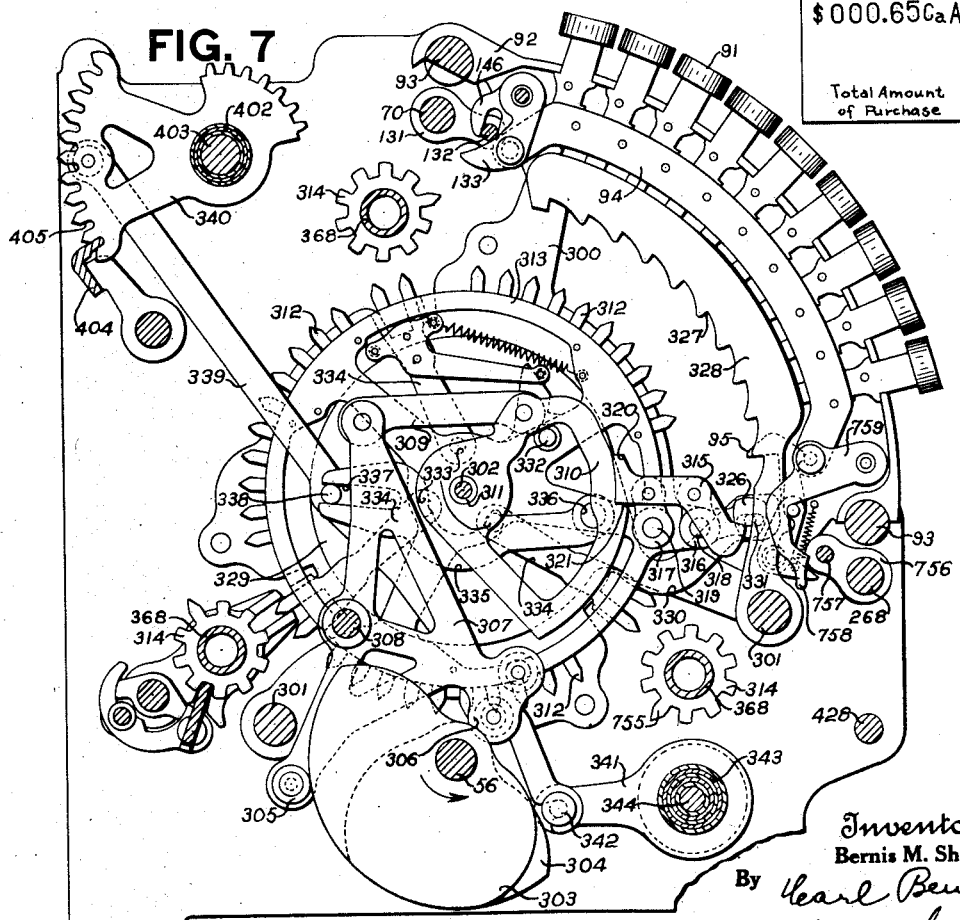

June 28, 1932.　　　B. M. SHIPLEY　　　1,865,147
CASH REGISTER
Filed Jan. 19, 1924　　15 Sheets-Sheet 4

Inventor
Bernis M. Shipley
By Pearl Beust
Henry E. Stauffer
His Attorneys

June 28, 1932. B. M. SHIPLEY 1,865,147

CASH REGISTER

Filed Jan. 19, 1924 15 Sheets-Sheet 5

Inventor
Bernis M. Shipley
By Pearl Beust
Henry E. Stauffer
His Attorneys

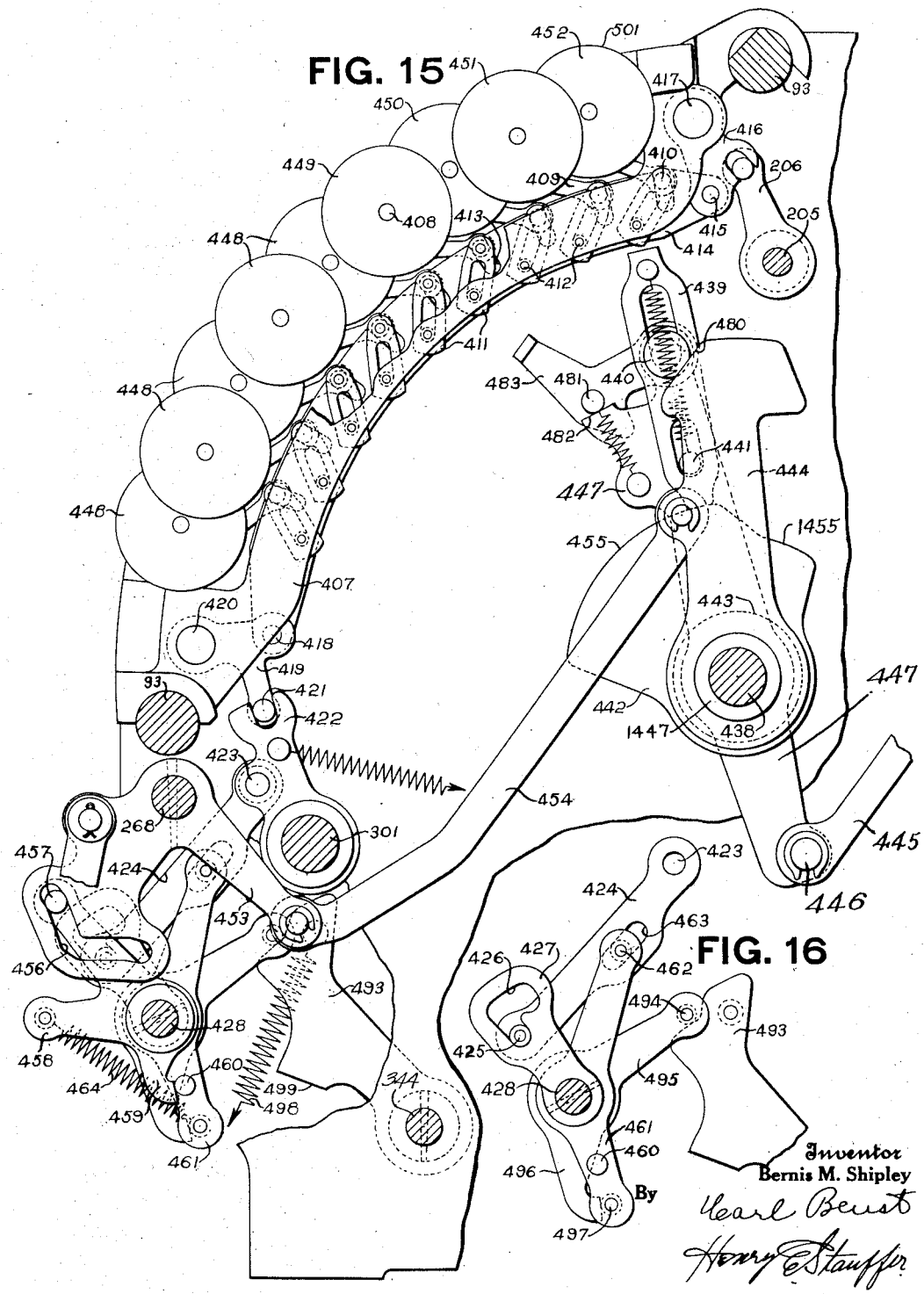

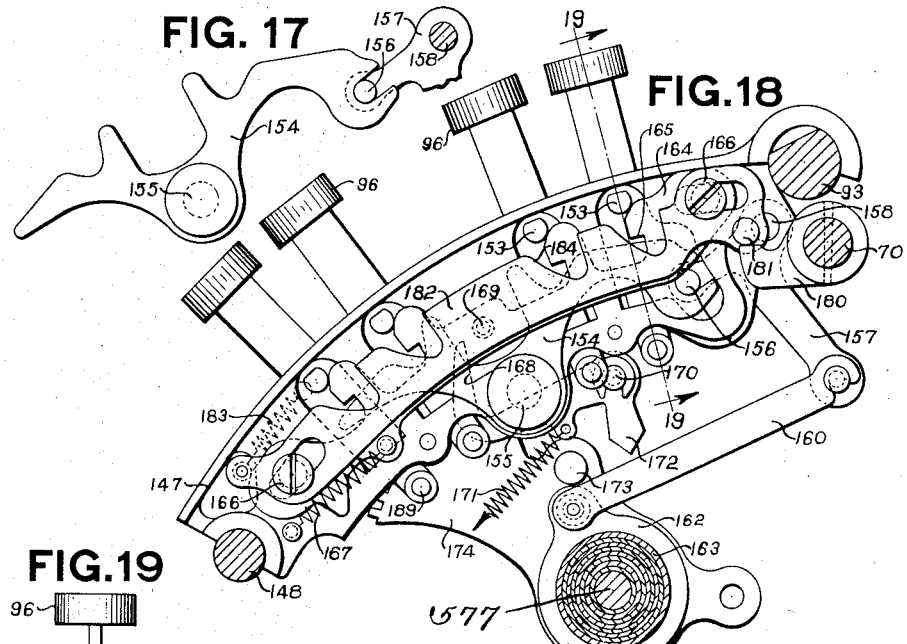
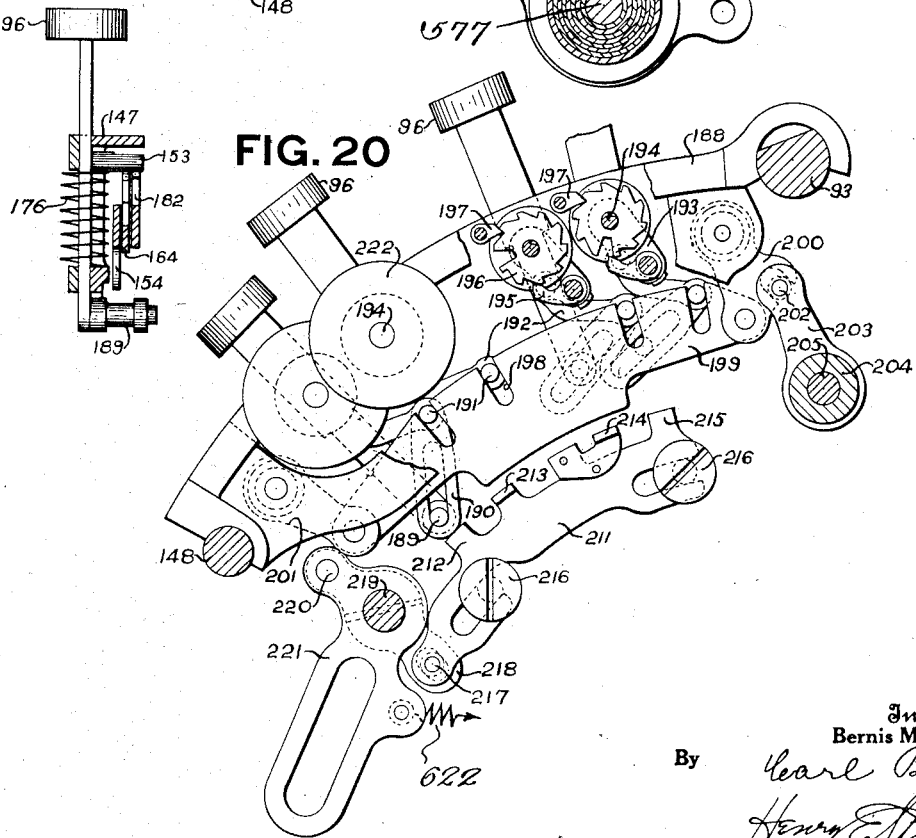

June 28, 1932.  B. M. SHIPLEY  1,865,147

CASH REGISTER

Filed Jan. 19, 1924  15 Sheets-Sheet 8

Inventor
Bernis M. Shipley

By *Earl Beust*
*Henry E. Stauffer*

His Attorneys

June 28, 1932.  B. M. SHIPLEY  1,865,147

CASH REGISTER

Filed Jan. 19, 1924  15 Sheets-Sheet 9

Inventor
Bernis M. Shipley
By Carl Benst
Henry E. Stauffer
His Attorneys

June 28, 1932.    B. M. SHIPLEY    1,865,147
CASH REGISTER
Filed Jan. 19, 1924    15 Sheets-Sheet 10
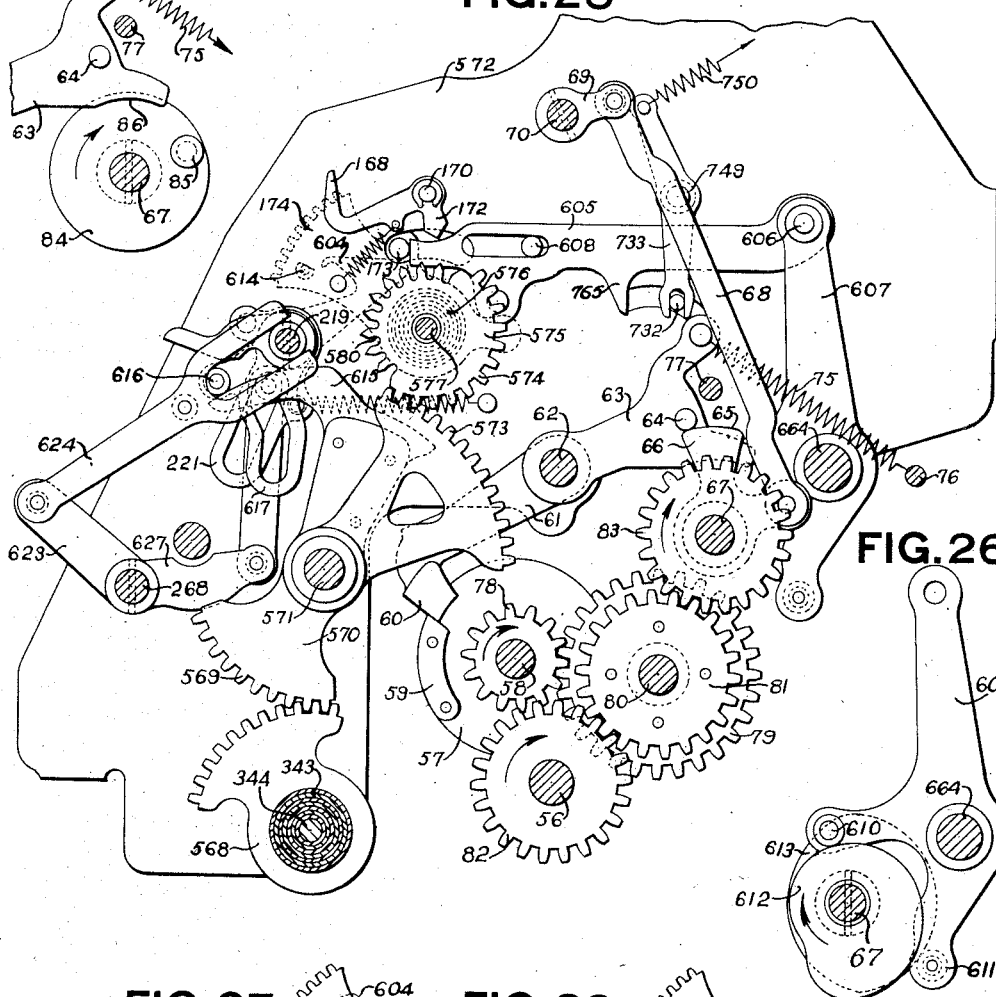
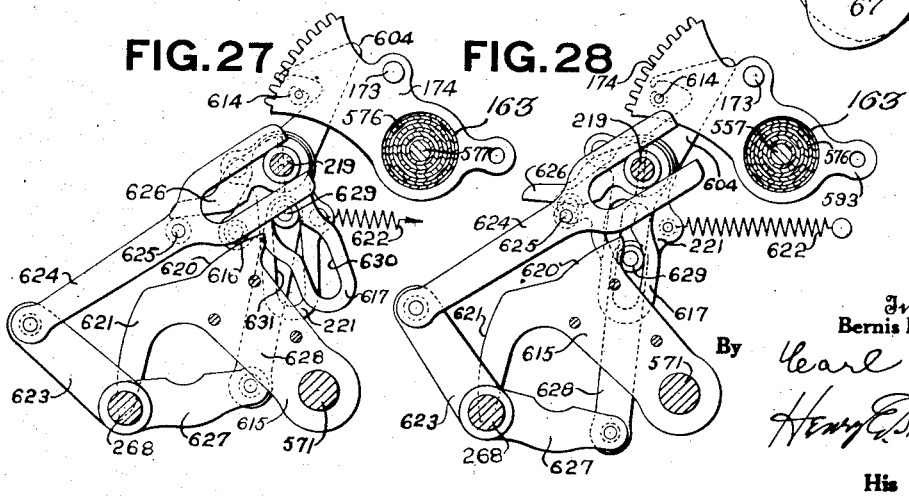
Inventor
Bernis M. Shipley
By Carl Beust
Henry E. Stauffer
His Attorneys June 28, 1932. B. M. SHIPLEY 1,865,147
CASH REGISTER
Filed Jan. 19, 1924 15 Sheets-Sheet 12
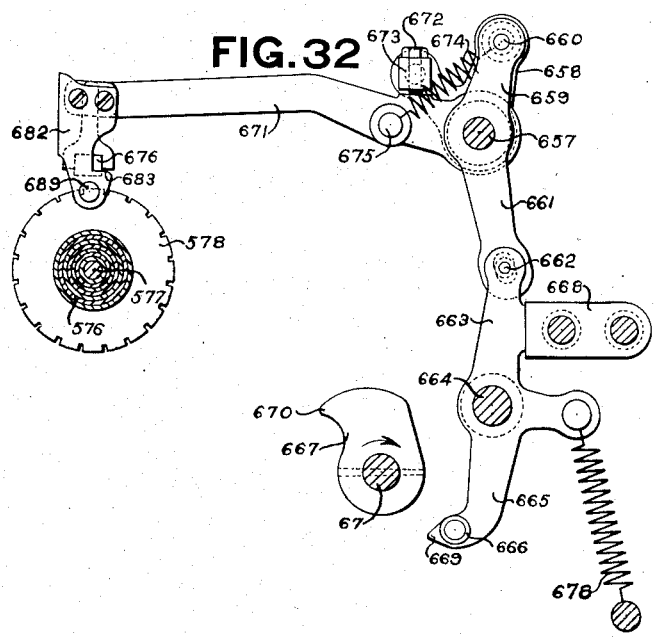
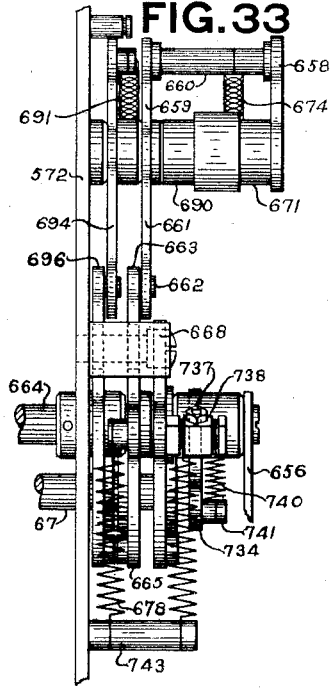
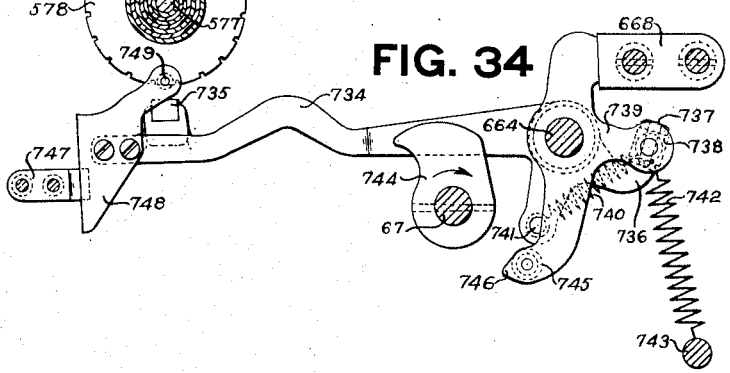
Inventor
Bernis M. Shipley
By Earl Beust
Henry E Stauffer
His Attorneys June 28, 1932.  B. M. SHIPLEY  1,865,147
CASH REGISTER
Filed Jan. 19, 1924  15 Sheets-Sheet 13
FIG. 37
FIG. 36
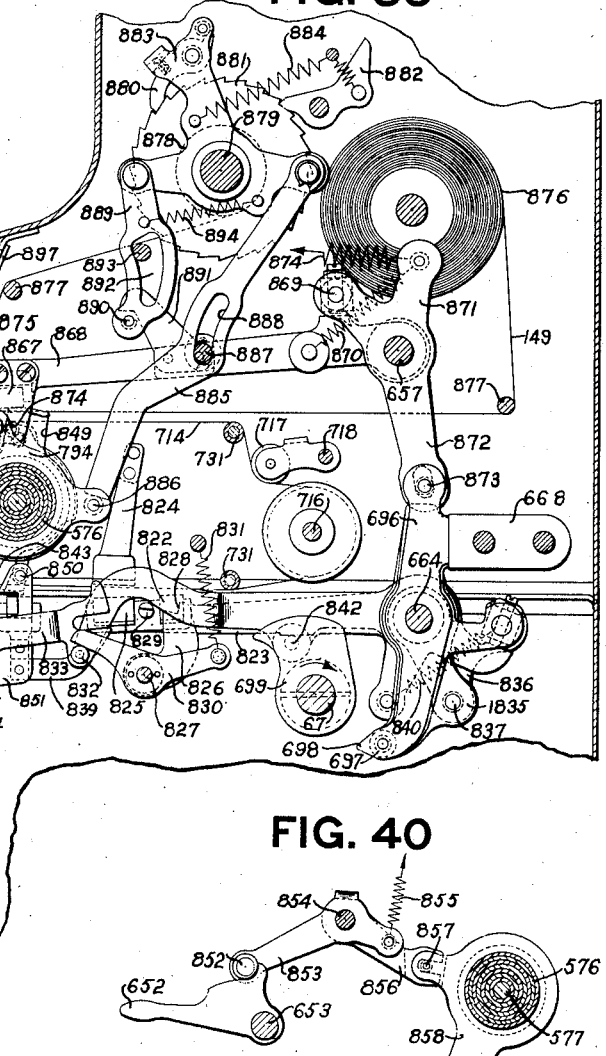
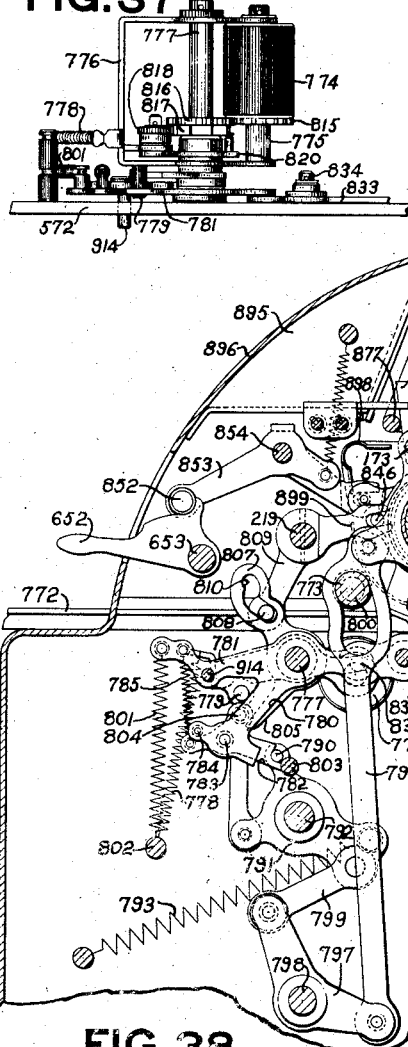
FIG. 40
FIG. 38
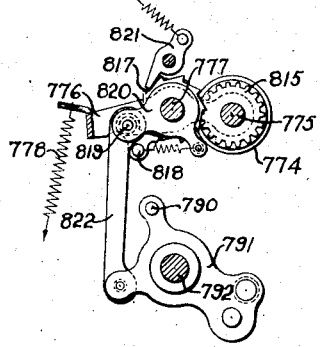
FIG. 39
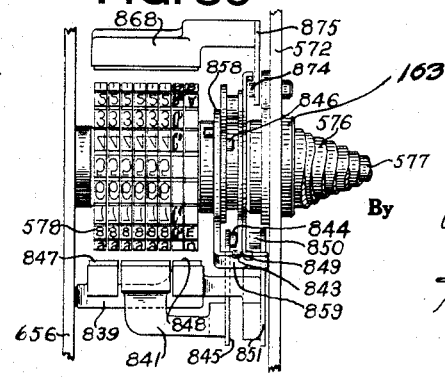
Inventor
Bernis M. Shipley
By Earl Beust
Harry E Stauffer
His Attorneys

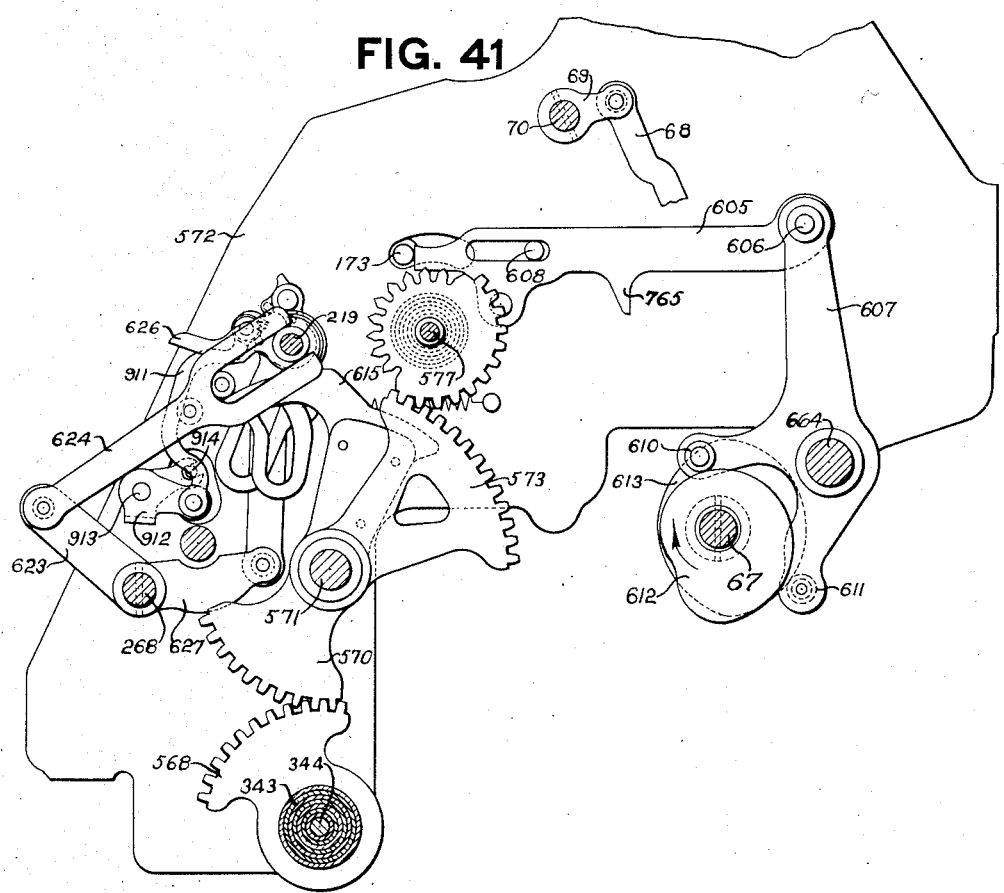
FIG. 41
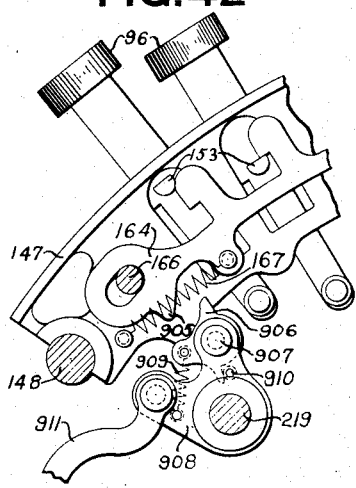
FIG. 42
FIG. 43

Inventor
Bernie M. Shipley
By
His Attorneys

Patented June 28, 1932

1,865,147

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 19, 1924. Serial No. 687,305.

This invention relates to cash registers and like machines, of the type shown in Letters Patent of the United States, No. 1,230,864, issued to W. A. Chryst on June 26, 1917, and Nos. 1,242,170 and 1,394,256, issued to F. L. Fuller Oct. 9, 1917 and Oct. 18, 1921, respectively, and in application for Letters Patent of the United States, Serial No. 608,281, filed by B. M. Shipley on Dec. 21, 1922.

It is an object of this invention to provide mechanism for printing and issuing either a one-item receipt or a multiple-item receipt with total, a transaction classification character, clerk's initial, and other matter of any desired wording, and for simultaneously printing a one-item transaction or the total of a multiple-item transaction upon a record strip retained in the machine.

Another object is to provide counting mechanism for registering the number of single-item transactions of various classifications, the number of items of multiple-item transactions of various classifications, and the number of multiple-item transactions.

Another object is to provide clerks' keys for controlling the operation of the machine, the returning of an operated key to normal position being under the control of the printing mechanism.

Another object is to provide counting mechanism for registering the number of operations of each clerk's key.

Another object is to provide money receptacle operating mechanism which will make the money receptacle accessible only at the completion of the registration of the transaction.

With these and incidental objects in view, the invention consists of certain novel features of construction and combinations of parts, the essential elements of which are set forth in appended claims, and preferred forms or embodiments of which are hereinafter described with reference to the drawings which accompany and form part of this specification.

Of said drawings:

Fig. 2 is a detail of the machine release mechanism.

Fig. 3 is an elevation of the right hand end of the machine showing the operating mechanism.

Fig. 4 is a fragmentary view of the record strip.

Fig. 5 shows the receipt issued on a single-item transaction.

Fig. 6 shows the receipt issued on a multiple-item transaction.

Fig. 7 is a sectional view taken to the left of one of the amount banks.

Fig. 15 is an enlarged view of the transaction special counters.

Fig. 16 shows a detail of the mechanism for disabling the special counter operating detent during certain totalizing operations.

Fig. 17 is an enlarged detail of the detent for setting the type for the clerks' bank of keys.

Fig. 18 is an enlarged view of the clerks' bank of keys.

Fig. 19 is a section taken on line 19—19 of Fig. 18.

Fig. 20 is an enlarged view of the clerks' special counters.

Fig. 24 is a detail of the cam for stopping the machine in its home position.

Fig. 25 is a section taken on a line just outside the left hand side frame and looking toward the left.

Fig. 26 is a detail of the check feed cam.

Fig. 27 is a detail of the mechanism for controlling the length of feed for the check paper, shown positioned for a short feed.

Fig. 28 shows the mechanism shown in Fig. 27 manually moved into position by the total lever, preparatory to making a totalizing operation.

Fig. 32 is a detail view of the mechanism for taking the item impression.

Fig. 33 is a rear elevation of the printing hammers.

Fig. 34 is a detail view of the mechanism for taking the impression on the record strip.

Fig. 36 is a sectional view of a modified form of printing mechanism.

Fig. 37 is a detail top plan view of the sales slip feed and impression hammer controls of the modified form.

Fig. 38 is a detail view of the sales slip feed and tension mechanism of the modified form.

Fig. 39 is a detail front elevation of the type-wheels and impression hammer controls of the modified form.

Fig. 40 is a detail view of the manual control for the impression hammer of the modified form.

Fig. 41 is a sectional view taken between the left hand side frame and printer frame, and shows a part of the clerks' key release mechanism in modified form.

Fig. 42 is a detail view of a portion of the clerk key unit, showing a part of the release mechanism of the modified form.

Fig. 43 is a facsimile of a sales slip printed by the modified form of mechanism.

*In general*

Figure 1:
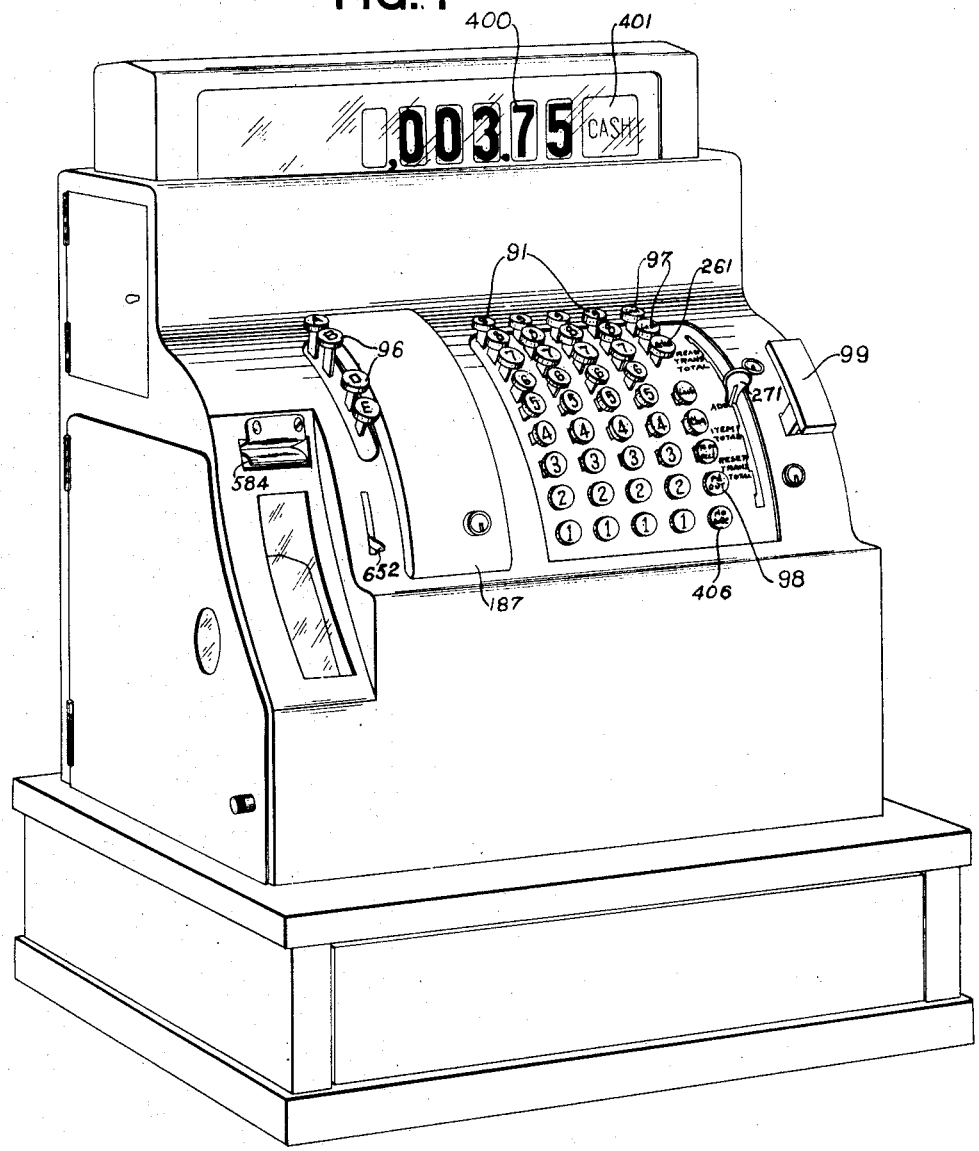
Fig. 1 is a perspective view of the machine.
Figure 8:
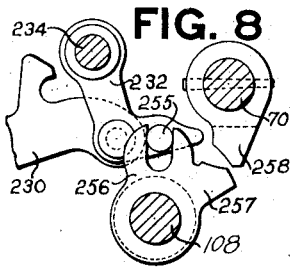
Fig. 8 is a detail enlarged view showing the interlock between the motor bar and transaction keys.

Described in general terms, the machine in its preferred form comprises a plurality of totalizers, one for each classification of transactions and one for totalizing each separate transaction. These totalizers are operated by differential mechanism under the control of manipulative means, which in this case are the amount keys.

The differential mechanism provides means for adjusting the printing mechanism to print on the issuing receipt the amounts which are entered on the totalizers, together with the total of the same, and to print on the record strip, transaction and classification totals.

The differential mechanism also provides means for adjusting the indicating mechanism to indicate the amount of each item recorded and the total of the items of a transaction.

The printing mechanism includes a single amount type line, including character typewheels for clerks and transactions, date typewheels, consecutive number type-wheels and suitable electros. The amount and transaction type-wheels are set differentially by means of two tube lines and intermediate segment gears. The clerk's type-wheel is set directly from the clerk's eye. The date typewheels are set by manually operated knobs in the usual manner, and the consecutive number type-wheels are operated by a differentially tined pawl. The date and consecutive number mechanism is omitted in these drawings, as it is no part of this invention and is fully illustrated and described in the Shipley application previously referred to.

This machine, in its present embodiments is especially adapted for use in places of business where it is desirable to issue an itemized printed receipt to the customer and also retain in the machine a record strip containing the totals of all transactions. When the total of a transaction is printed, the transaction totalizer is restored to normal or zero position. A sub-total from a classification totalizer may be printed and the totalizer not restored to zero, or a total may be printed and the totalizer restored to zero.

*Operating mechanism*

The machine is manually operated by a handle 50 (Fig. 3) provided with a stud 51 extending into a short, tubular bearing 51 (Fig. 2), secured to the right hand frame of the machine. Connected to the handle 50 is a pinion 52 meshing with a gear 53 mounted on a stud 54 projecting from the frame of the machine. The gear 53 meshes with the gear 55 secured on the main driving shaft 56. The ratio of the pinion 52 and the gear 55 is such that two rotations of the handle cause one rotation of the shaft 56.

The machine may also be operated by an electric motor of the well known type illustrated and described in Letters Patent of the United States No. 1,144,418, granted to Charles F. Kettering and W. A. Chryst on June 29, 1915. For a detailed description of the same, reference may be had to that patent. Only a part of the motor clutch mechanism is shown in the accompanying drawings.

The motor is mounted on the left side frame of the machine. The clutch mechanism between the motor and the machine includes a spring-actuated disk 57 (Fig. 25) mounted upon a stud 58. This disk carries a block 59 which normally contacts the forward end 60 of an arm 61 pivoted on a stud 62 on the frame of the machine. An arm 63 secured to the arm 61 carries a pin 64 which normally rests on a curved edge 65 of an arm 66 pivoted on a printer driving shaft 67 journaled in the printer frame. The arm 66 is connected by a link 68 to an arm 69 secured to a shaft 70 extending across the entire machine and journaled in the frames thereof. When the arm 69 is rocked clockwise to release the machine, as will hereinafter be described, the arm 66 is rocked clockwise from beneath the pin 64, permitting a spring 75, attached to the arm 63 and to a pin 76 projecting from the frame of the machine, to move the end 60 of the arm 61 away from the block 59. The clockwise movement of the lever is limited by a pin 77 projecting from the frame of the machine. Upon release of the arm 61 the disk 57 is moved clockwise by a spring (not shown), causing an effective connection between the motor and the driving clutch to operate the machine, as fully described in the above mentioned Kettering and Chryst patent. The main drive shaft 56 is driven from a gear 78 (Fig. 25), secured to the driving clutch, meshes with an intermediate gear 79 freely mounted on a stud 80 supported in the side frame of the machine. Pinned to gear 79 is a gear 81 which meshes with a gear 82 secured to the main driving shaft 56. The gear 81 also meshes with a gear 83 secured to the printer driving shaft 67. The main driving shaft 56 and the printer driving shaft 67 make one complete rotation during an adding operation of the machine.

The arm 61 is restored to locking position near the end of the operation of the machine by means of a disk 84 (Fig. 24) pinned to the shaft 67. This disk carries a pin 85 which engages a curved edge 86 of the arm 63 to restore the arm 61 to stop the machine. This permits return of the arm 66 and consequently the shaft 70, to their home positions.

Keyboard

The keyboard mechanism of the present machine is the same as that shown and described in the before mentioned patents and application, and reference is hereby made thereto for a full and clear description of the same. Only a brief description of the keyboard and its cooperating mechanism will be given herein.

The keyboard comprises four banks of amount keys, one bank of clerk's keys, a bank consisting of two groups of transaction or classification keys, a key for releasing a depressed transaction key, a starting key, and a total lever for controlling the machine for total and sub-total printing.

The keys 91 of each amount bank are mounted in an individual frame 92 (Fig. 7) mounted on cross rods 93 carried by the machine frame. The keys are retained in their normal outer positions by the usual compression springs.

When a key 91 is depressed it cooperates with a detent 94 (Fig. 7), by which it is retained in its depressed position, as is well known in the art. Each bank is provided with a zero stop pawl 95, pivoted to the frame of the bank and adapted to be rocked into ineffective position upon movement of the detent 94 upon depression of any key 91 in the bank.

The machine is normally released for operation by the depression of a clerk's key 96, a transaction key 97 or 98, and the starting key 99 (Figs. 1, 2, 3, 8, 9, 10, 11 and 18) which releases the shaft 70. The starting key 99 (Fig. 2) is detachably mounted upon a slide 100 which is supported by two studs 101 engaging elongated openings 102 in the slide 100. These studs are mounted in the frame of the machine. The key is retained in its normal outer position by a spring 103. The slide carries a pin 104 embraced by a forked arm 105 pivoted on the bearing 51, and connected by a link 106 to one arm of a bell crank lever 107 pivoted on a rod 108 supported in the frame of the machine. The other arm 109 of the lever lies in the path of a flat sided pin 110 carried by an arm 111 pinned to the shaft 70 to compel depression of the key 99 to release the machine. Depression of the starting key 99 moves the arm 109 out of the path of the pin 110, thereby permitting the shaft 70 to be rocked to release the motor clutch mechanism previously described. When the shaft 70 is rocked to release the motor clutch, the pin 110 moves under the arm 109, thus holding the starting key 99 depressed. Near the end of the operation of the machine, the shaft 70 moves back to, and past its home position, and consequently, the pin 110 moves out from under the arm 109 and past the end of the non-repeat pawl 118. Removal of the pin 110 from beneath the arm 109 permits the spring 103 to return starting key 99 to its normal released position. The non-repeat pawl 118 is provided to prevent repeat operations if the starting key should be held depressed during the entire operation of the machine. This arm is normally held against an offset 120 on the arm 109 by a spring 119, but when the starting key 99 is depressed, the arm 109 and the offset 120 are elevated out of contact with the non-repeat pawl 118, and the pin 110 prevents the pawl 118 from following the arm 109. If the starting key 99 is held depressed during the entire operation of the machine, thus holding the arm 109 elevated, then near the end of the operation of the machine, when the shaft 70, arm 111 and pin 110 are moved back past their home positions and past the end of the non-repeat pawl 118, the spring 119 will rock the non-repeat pawl 118 upwardly until it contacts the elevated arm 109, thus locking the machine against another operation. In this position, the end of the non-repeat pawl 118 is in the path of the pin 110, consequently the machine cannot be released, even though the starting key 99 is held depressed and the arm 109 remains elevated. When pressure is removed from the key 99, the spring 103 restores the starting key 99 and the arm 109 to normal position, and the non-repeat pawl 118 is returned to normal position by the arm 109 through its shoulder 120.

The shaft 70 is moved by means of a lever 121 (Fig. 3) secured thereto outside of the right hand frame of the machine. This lever carries a screw stud 122 supporting two spring retaining pilots 123, placed on opposite sides of the link 124, which is slotted to move over the stud. A coil spring 125 surrounding the lower ends of these pilots is compressed between shoulders on said pilots and the end wall of a slot 126 in the link 124. From this it can be seen that as the starting key is depressed and the arm 120 (Fig. 2) is moved counter-clockwise, the spring 125 (Fig. 3) is released to rock the shaft 70 clockwise to release the motor clutch mechanism, previously described. The movement of the shaft 70 is limited by a projection 127 on the lever 121 and a pin 128 projecting laterally from an arm 129 pivoted on the shaft 70.

The arm 129 has a laterally extending stud 130 which projects through a slot in the casing of the machine to enable the operator to move this arm in a counter-clockwise direction and release depressed amount keys for correction. As the arm 129 is moved counter-clockwise, the pin 128 will engage the projection 127 on the lever 121 and rock the shaft 70 counter-clockwise. The keys are released by a rod 132 carried by arms 131 (Fig. 7) connected to the shaft 70. This rod engages the arms 133 which support the upper ends of the key detents 94 to lower the detents to release the depressed keys. This rod also cooperates with a link 146 in the usual manner to control a locking bar, not shown, but clearly disclosed in the patents referred to. The arm 129 (Fig. 3) is normally retained in engagement with a pin 134 secured in a locking link 135, by a spring 136. The locking link 135 is pivoted at a point 137 to the arm 129, and near the lower end of the locking link 135 is an elongated opening 138 which is engaged by an eccentric portion on a lock 139 mounted on the frame of the machine.

This lock is provided to lock the machine against operation. Before the lock can be operated, it is necessary to raise the arm 129 until the pin 128 engages the projection 127 on the arm 121, in which position a shoulder 140 near the lower end of the locking link 135 will be in a position to clear a square pin 141 projecting from the side frame. In this position the lock is turned to move the locking link 135 to place the shoulder 140 over the pin 141, and with the locking link 135 in this position the shaft 70 cannot rock clockwise when the starting key is operated.

Clerks' keys

Figure 31:
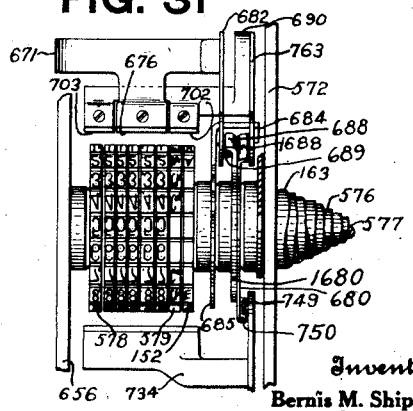
Fig. 31 is a detail front elevation of the type-wheels and the printer hammers, and the mechanism for disabling printing hammers.

There are four clerks' keys 96 (Figs. 1, 18, 19 and 20) located near the left side of the machine. These keys are mounted in a key frame 147 which is supported by the rod 93 and a rod 148. A type-wheel 152 (Fig. 31) having characters corresponding to these keys is positioned directly by them by the following means. Each of the keys is provided with a pin 153 (Fig. 18) to rock a pivoted lever 154 (see also Fig. 17) either clockwise or counter-clockwise, according to the key depressed. This lever 154 is pivoted on a stud 155 mounted in the key frame 147. One end of the lever 154 is bifurcated to engage a pin 156 carried by an arm of a bell crank lever 157 pivoted on a stud 158 supported in the key frame. The other arm of the bell crank lever is connected by a link 160 to an arm 162 secured to a sleeve 163, to which also is secured the clerk's type-wheel 152 (Fig. 31).

The clerks' keys 96 (Fig. 18) when depressed are so retained by a detent 164 moved toward the right by depression of a key, and which is returned to home position by a spring 167, in which position the corresponding shoulder 165 holds the key depressed through its engagement with the pin 153. The detent is mounted upon studs 166. The depressed clerks' keys are returned to normal by a spring 176 (Fig. 19), near the end of a single-item operation and during the second cycle of a totalizing operation, after the detent 164 has been moved to the right to disengage the shoulder 165 from the pin 153. The detent is moved to release the keys by a bell crank (Fig. 18), one arm 168 of which is adapted to contact a pin 169 on the detent 164. The bell crank is pivoted on stud 170 and is held in normal position by a spring 171. The other arm 172 of the bell crank is adapted to be engaged by a pin 173 carried in a segment gear 174 pivoted upon the sleeve 163. As the segment gear 174 moves clockwise, the pin 173 strikes the arm 172 and moves this arm in a counter-clockwise direction until the pin 173 passes off the arm, when the arm is brought back to its normal position by the spring 171. As the segment gear 174 returns to its normal position, moving counter clockwise direction, the pin 173 strikes the rear end of the arm 172, thereby rocking the arm 168 into contact with the pin 169 to move the detent 164 to the right, thus releasing the depressed key, as hereinbefore described.

Mechanism is provided to compel depression of a clerk's key before the starting key can be effective to release the machine. The mechanism includes an arm 180 (Fig. 18), pinned to the shaft 70, normally contacting the under side of a pin 181 on a slidable bar 182, slidably mounted on the screw studs 166 and retained in normal position by a spring 183. As a clerk's key is depressed, its pin 153 engages an inclined edge 184 of the bar 182 and moves the bar toward the left and withdraws the pin 181 from the path of the arm 180 to permit the release of the machine by depression of the release key 99.

Clerks' key counters

A counter is provided for each clerk's key 96 (Fig. 20) to count the number of transactions registered by the clerk. These counters are of the usual step-by-step type. They are mounted in a frame 188 located to the right of the clerks' key frame 147 under the cover 187 (Fig. 1). These counters are operated during a single-item transaction and during the second cycle of the totalizing operation of a multiple-item transaction. The mechanism as shown in Fig. 20 is positioned for a single-item transaction.

To select the counters for actuation, each key 96 is provided with a pin 189 entered into an elongated opening in a link 190, connected by a pin 191 to an operating link 192, connected at its upper end to an arm 193 pivoted upon the counter shaft 194. The arm 193 carries a differentially tined pawl 195 which engages ratchet wheels 196 to operate the counter in the usual way. Spring-actuated retaining pawls 197 prevent retrograde movement of the counter wheels. The pin 191 engages a slot 198 formed in a reciprocating driver 199, common to all the counters pivoted at its ends to arms 200 and 201 mounted on studs supported in the frame 188. The arm 200 has a slot engaging a pin 202 in an arm 203 secured to a sleeve 204 pivoted on a rod 205. Secured to the right hand end of the sleeve 204 is an arm 206 (Fig. 15), which is oscillated during the operation of the machine by means which will hereinafter be described. A sliding counter selecting bar 211 (Fig. 20) is provided with projections 212, 213, 214 and 215, which provide obstructions to cooperate with the lower ends of the connecting links 190, actuated by the keys to enable the reciprocating driver 199 through the selected operating link 192, to operate the counter carrying pawl 195 of the counter corresponding to the key depressed. The selecting bar 211 is guided in its sliding movement on two screw studs 216 which engage slots formed therein. The lower key 96 is shown depressed, with its connecting link 190 moved into contact with the obstruction 212. As the driver 199 moves toward the left, the operating link 192 is forced toward the left, which causes the counter carrying pawl 195 to move the ratchet wheel 196 one division of movement. The counter selecting bar 211 is connected at its lower end by a stud 217 to an arm 218 pinned to a rock shaft 219. Secured to the arm 218 by a rivet 220 is a bell crank 221 which is oscillated to adjust the selecting bar 211 by mechanism shown in Figs. 25, 27 and 28, to be hereinafter described.

In a transaction involving two or more items, the selecting bar 211 is moved toward the right to an ineffective position during the first item entering operation, and is returned to the effective position, as shown in Fig. 20, during the second cycle of a totalizing operation, all of which will hereinafter be described.

The counting devices may be reset to zero at any time by manually turning the usual disks 222, secured to the counter shafts 194, all of which is old and well known in the art.

Transaction keys

The transaction keys consist of two groups arranged in a single bank and mounted in a common frame 227 (Fig. 11) supported by the rods 93. The upper group of keys 97 is used in registering multiple-item transactions and the lower group of keys 98 is used in registering single-item transactions.

The keys are held in their normal positions by springs 229 (Fig. 3) and are retained in the depressed positions by a spring-actuated locking detent 230 (Fig. 11) engaging pins 231 on the keys. The detent 230 is pivotally mounted on arms 232 and 233, which swing on pins 234 and 235, respectively.

Figure 9:
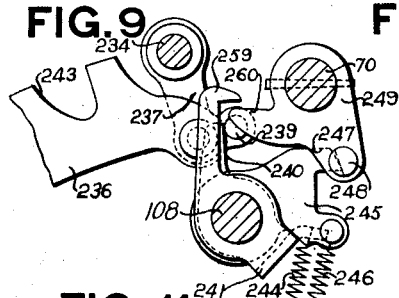
Fig. 9 is a detail enlarged view showing the release trip mechanism.
Figure 10:
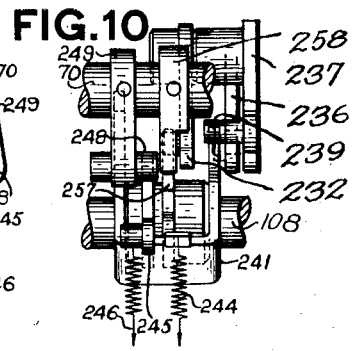
Fig. 10 is a rear elevation of the mechanism shown in Figs. 8 and 9.

The key pins 231 also wipe against beveled walls 243 and 288 of recesses formed in a movable settable bar 236 to shift the bar and operate interlocking mechanism between the transaction keys and the starting key 99. The setting bar 236 is pivotally supported by a link 237 (Figs. 9 and 12) freely mounted upon the pin 234 and a link 238 (Figs. 11 and 13) freely mounted upon the pin 235. Mounted in the link 237 is a pin 239 which contacts an upwardly projecting arm 240 of yoke 241, pivoted upon the rod 108. As the key is depressed the pin 231 engages the inclined wall 243 on the settable bar 236 and moves it toward the left to rock the yoke 241 counter-clockwise. The arm 240 of the yoke 241 is maintained in contact with the pin 239 by a spring 244 (Figs. 9 and 10). As the yoke 241 moves counter-clockwise it carries with it a machine releasing pawl 245 pivoted upon the rod 108 and held in contact with the upper edge of the yoke 241 by a spring 246.

This releasing pawl has a projection 247, which normally lies in the path of a flat sided pin 248 mounted in an arm 249 pinned to the shaft 70 (Figs. 9 and 10). This forms an interlock between the transaction keys and the starting key so that if the starting key 99 (Fig. 2) is operated without first depressing a transaction key it will have no effect in starting the machine. If the transaction key is depressed in its proper sequence the projection 247 will be out of the path of the pin 248 when the starting key is operated.

If a transaction key is held in a partially depressed position and the starting key is operated, the machine will not be released for operation. With a transaction key partially depressed, the arm 256 (Fig. 8) will be moved counter-clockwise to place a node 257 thereon in the path of the arm 258. In this position, when the starting key is operated, the shaft 70 is rocked clockwise by the spring 125 (Fig. 3) until the arm 258 is arrested by the node 257, but not far enough to start the machine. The spring 125 holds the arm 258 in contact with the node 257 and the friction caused thereby overcomes the power of the spring on the detent 230, thus causing the detent to be retained in an ineffective position so that a transaction key will not be latched in a depressed position and the starting key will be ineffective to start the machine.

Depression of a transaction key moves the releasing pawl 245 (Fig. 9) counter-clockwise, permitting the shaft 70 to rock clockwise far enough to allow the flat-sided pin 248 to come under the projection 247, there being sufficient clearance between the pin 110 and the arm 109 (Fig. 2) to permit a slight movement of the shaft 70. Then if the key is released, the yoke 241 (Fig. 9) will return to normal position with a hook 259 over a projection 260 on the arm 249, but the pawl 245 will not return. With this condition, the hook will prevent the releasing of the machine if the starting key is depressed, making it necessary for a transaction key to be in depressed position before the machine can operate, even though the arm 257 has been permitted to be returned to home position by relieving the pressure of the arm 258 on the node 257.

Figure 11:
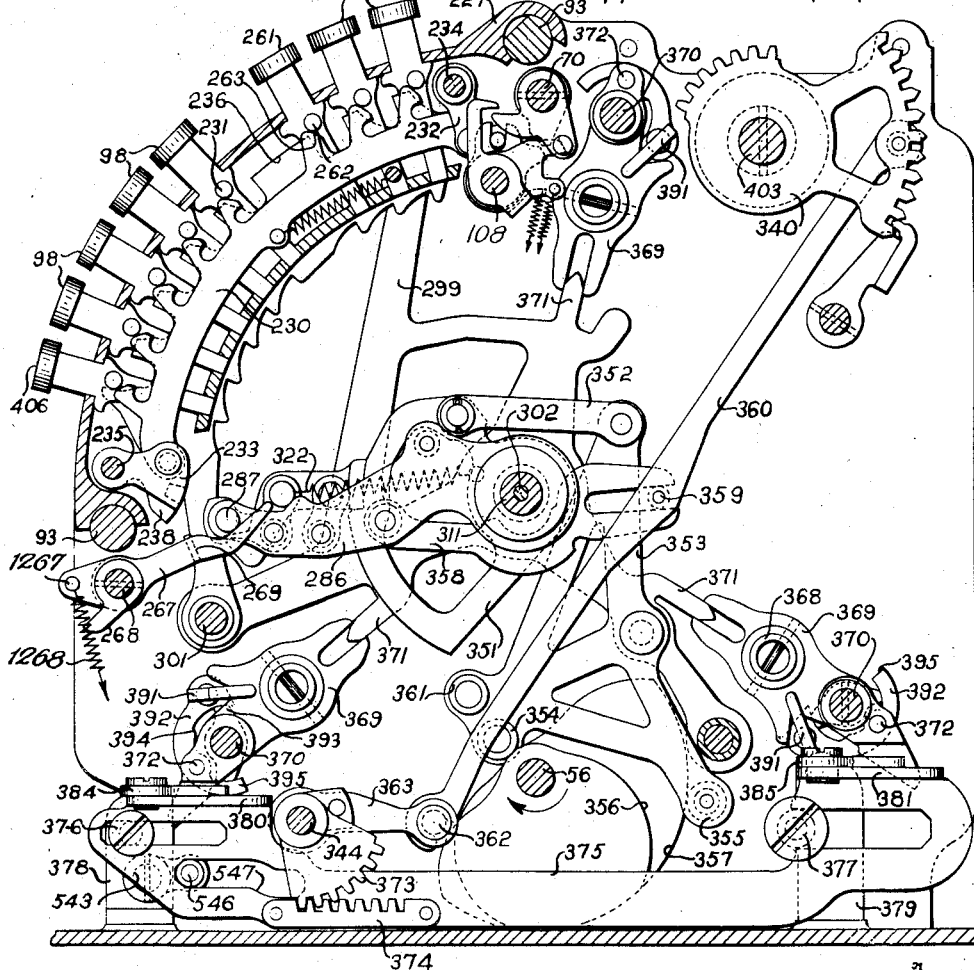
Fig. 11 is a sectional view taken to the right of the transaction bank.

The transaction keys are not restored to normal positions during the operation of the machine as the clerks' keys and amount keys are, but remain in the depressed positions unless released by depressing another transaction key or a release key 261 (Fig. 11). This release key has a pin 262 normally adjacent the angle wall 263 on the detent 230 to move this detent to the left and release any depressed transaction key. Depression of the release key does not affect the settable bar 236, as this bar has a recess opposite the key pin 262. This key 261 is retained in normal position by the usual spring, which is not shown here.

In entering a "multiple item" transaction, the operated key 97 should be locked in depressed position, and all other transaction keys locked against depression, until the completion of the entire transaction.

This result may be conveniently obtained by arranging the inclined walls of those recesses in the setting bar 236 which lie beneath the "multiple item" keys 97, so that upon depression of a "multiple item" key 97, the setting bar 236 is given a greater extent of movement than is imparted to it by the "single item" keys 98, and by providing the link 238, to which the lower end of the setting bar 236 is pivoted, with a notch 270 (Figs. 12 and 13), engageable by a locking bail 269 journaled on a shaft 268.

When a "single item" key 98 is depressed, the setting bar 236 is not shifted a sufficient distance to swing the notched link 238 far enough to bring the notch 270 into the path of locking bail 269. But, owing to the longer incline of the walls 243 of the notches in the setting bar 236 beneath the "multiple item" keys 97, depression of a "multiple item" key will shift the setting bar 236 and its link 238 to such an extent that, upon complete depression of the key and the restoration of the detent bar 230 and its link 233 to locking position, the notch 270 in the link 238 is located in the path of the locking bail 269, preparatory to the entry of the edge of the locking bail 269 thereinto.

An arm 267, pivoted on the shaft 268 is fast with the locking bail 269 to control the latter. The inner free end of the bail arm 267 extends inwardly into the path of the stud 287 projecting from the usual differential movable arm 286, which stud normally maintains the bail arm 267 and the locking bail 269 in idle position against the tension of a spring 1268 connected with a stud 1267 on the arm 267, which tends to rock the arm 267 and locking bail 269 counter-clockwise towards the link 238.

Figures 12, 13, 14:
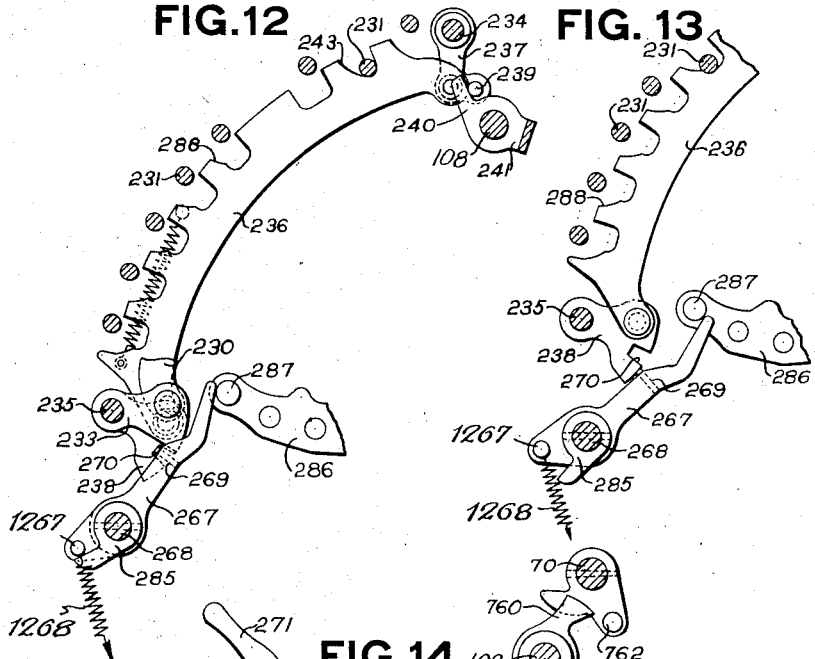
Fig. 12 is a detail of the release detent and mechanism for locking the multiple-item keys in their depressed position until a total is printed.
Fig. 13 shows some of the mechanism shown in Fig. 12 in position for a single-item transaction.
Fig. 14 shows the total lever and some of the mechanism it controls.

Depression of an item key, and amount keys, followed by an operation of the machine, rocks the differential arm 286 clockwise, in the well known manner, to select the proper totalizer, and in so doing, the differential arm 286 releases the bail arm 267 to the action of its spring 1268, which rocks the arm 267 and its locking bail 269 counter-clockwise, to enter the bail 269 in the notch 270 and hold the depressed "multiple item" key 97 in its depressed position (as shown in Fig. 12), throughout two or more operations of the machine.

The extended travel permitted the locking bail 269 when it enters the notch 270, positions the bail beneath the link 233 to thereby lock all other keys in the transaction bank against depression.

When a "single item" key 98 is depressed, and the machine is operated, the limited travel permitted the locking bail 269 is such that the free end of the bail arm 267 remains in the path of the stud 287 when the bail contacts the unnotched end of the link 238 (as shown in Fig. 13), so that upon the return of the differential arms 286 at the end of the operation, the stud 287 contacts the bail arm 267 and restores it, together with the bail 269, to idle position (as shown in Fig. 11). But when a "multiple item" key 97 is depressed, and the machine is operated, the extended travel of the bail 269 withdraws the free end of the arm 267 from the path of the stud 287 on the differential arm 286 (Fig. 12).

Therefore, to effect the release of the depressed "multiple item" key 97, and the restoration of the locking bail 269 to its idle position, I provide the usual total lever 271 (Fig. 14) with a cam slot 272. After all the items of a "multiple item" transaction have been entered in the machine, the total lever 271 is manually shifted from its normal "add" position to the "item total" position, and after the total is printed, the total lever is restored to its normal "add" position. A roller 1273 carried on one arm of an intermediate lever 273 pivoted at 274, enters the cam slot 272 in the total lever, the opposite arm 275 of the lever 273 having formed on one edge thereof a cam recess 1275. A link 276 also pivoted at 274 and overlying the arm 275 of the lever 273, has a complementary cam recess 1276 formed in its edge, which cooperates with the cam recess 1275 formed in the arm 275 of the lever 273 to constitute a cam slot. A spring 279 connects a stud 280 on the link 276 with the arm 275 of the lever 273 to hold these parts together, with the stud 280 in contact with the upper end of the arm 275. This arrangement provides a flexible cam mechanism which will yield to prevent injury to the machine in case the shaft 268 is locked by a depressed key, at the time the total lever 271 is shifted from its "add" position. A crank 278 fast on the shaft 268, on which the bail-carrying arm 267 is pivoted, carries a roller 277 entered in the cam slot formed by the complementary edges of the arm 275 of the lever 273, and the link 276.

When the total lever 271 is adjusted from its "add" position to its "item total" position, its cam slot 272 rocks the lever 273 in a counter-clockwise direction, and the arm 275 of the lever 273 together with the link 276, rocks the crank 278 and shaft 268 in a clockwise direction.

A tappet 285 (Figs. 11, 12 and 13), fast on the shaft 268 is thereby rocked to contact a stud 1267 on the bail arm 267.

As is customary in machines of the type to which this invention is applied, a total-taking operation includes two cycles of rotation of the main drive shaft 56 of the machine, during the latter part of the first of which cycles, the shaft 268 is rotated slightly farther in a clockwise direction (by means later described) which presses the tappet 285 against the stud on the bail arm 267 to rock the bail arm 267 clockwise sufficiently to return the free end of the bail arm into the path of the stud 287 on the differential arm 286, while the latter is at a point some distance above the bail arm 267, so that as the differential arm 286 is restored, its stud 287 strikes the free end of the bail arm 267 and withdraws the locking bail 269 from the notch 270 in the link 238 to permit the release of the depressed "multiple item" key 97.

Near the end of the operation of the machine the parts operated by the depression of the starting key are restored to their normal positions by the cam 289 (Fig. 3) formed in the gear 53. Cooperating with this cam is a roller 290 mounted on a stud carried by an arm 291, pivoted on a stud 292 projecting from the side frame of the machine. The upper end of the arm 291 carries a pin 293 which normally enters an offset of an aperture 294 in the link 124. As the gear 53 rotates, the arm 291 is moved first clockwise and then counter-clockwise which causes the link 124 to move downwardly and return. As the screw stud 122 is in contact with the upper end of the slot 126 at this time, the shaft 70 is rocked counter-clockwise, which permits the arm 109 (Fig. 2), and the releasing pawl 245 (Fig. 9) to return to their normal positions, allowing all other parts cooperating with these parts to return to their normal positions.

The total lever 271 is provided for controlling the machine on total and subtotal printing operations.

*Differential mechanism*

The differential mechanism of the machine is used to operate the different totalizers differentially and to select them for operation, and also to set type carriers in the printing mechanism as controlled by the bank of amount keys and the bank of transaction keys.

*Differential-amount banks*

There is a differential unit for each of the four amount key banks and two extra units of higher denominations, which are operated in adding operations only when a transfer by them is necessary. Each unit is supported by two hangers 299 and 300 (Figs. 7 and 11), mounted upon rods 301. A rod 302 extends through all of the differential units, including the transaction unit, and acts as a stabilizer for said units.

Each differential unit (Fig. 7), is driven by a pair of cams 303 and 304 fixed on the shaft 56. These cams cooperate with rollers 305 and 306 respectively on a Y-shaped lever 307 pivoted on a stud 308 on the hanger 299.

The upper end of the lever 307 is connected by a link 309 to a driver 310 loose on a hollow stud 311 fastened in the hanger 300. The counter-clockwise movement of the cams 303 and 304 (Fig. 7) oscillates the lever 307 first counter-clockwise and then clockwise to normal position. This movement through the link 309 rocks the driver 310 first counter-clockwise and then clockwise to its normal position.

There are three differentially movable segments 312 in each unit, mounted between and secured to nearly circular plates 313 having fast thereto a hub (not shown) journaled on the stud 311. The segments 312 operate totalizer pinions 314 of three totalizer lines, to be hereinafter described. The differentially movable plates 313 are connected to the invariably movable driver 310 by a latch 315 carried by arms 316 and 317 pivoted at 318 and 319, respectively, to the plates 313. A foot 320 of the latch 315 is normally held in engagement with the driver 310 above a shoulder 321 by a spring similar to a spring 322 of the transaction bank shown in Fig. 11.

By this latch connection the plates 313 and segments 312 are rotated counter-clockwise (Fig. 7) until an arm 326 integral with the arm 316 strikes the end of a depressed key. When this occurs, the arms 316, 317 and 326 are moved clockwise, thereby disengaging the foot 320 from the shoulder 321. The foot 320 then rides upon the outer periphery of the driver 310 as the driver continues its invariable movement. When the latch is thus disengaged, the forward end thereof engages a notch 327 opposite the depressed key, in a latch-retaining bar 328 mounted upon the rod 301 and the upper end of the hanger 300. There are ten notches 327 in the latch-retaining bar 328, one for each of the nine keys and one at the zero position. When there is no amount key depressed the latch is disengaged in the zero position by the zero stop pawl 95. Adjacent one of the plates 313, and pivoted on the stud 311, is a reset spider 329 (Fig. 7) having an arm 330 surrounding a stud 331 carried by the arm 326. For a detailed description of a reset spider similar to the reset spider 329, see the United States Letters Patent, No. 1,230,864, granted to W. A. Chryst on June 26, 1917. The reset spider (numbered 340) is shown in Fig. 6 of that patent. The arm 330 is in the plane of the zero stop pawl 95 and when there is no key depressed, the upper edge of the arm 330 strikes the pawl 95, thereby disengaging the latch 315 from the driver 310. This arrests the rotation of the segments 312 and their supporting members.

When the driver 310 is rocked clockwise (Fig. 7) it engages a pin 332 carried by the plates 313 and rotates said plates to their normal positions during which time the segments 312 add upon the totalizer pinions. The time when the driver 310 engages the pin 332 varies according to the key that has been depressed. The totalizer pinions 314 are, by means to be hereinafter described, rocked into engagement with the segments 312 just before the segments are returned to their normal positions. As the segments return to their normal positions, the amounts, as determined by the depressed keys, are accumulated on said pinions.

*Differential—transfer*

When one of the totalizer pinions 314 passes from "nine" to "zero", a transfer mechanism is tripped, causing "one" to be added upon the totalizer pinion of next higher denomination. Pivotally mounted between the plates 313 on pins 333 (Fig. 7) are three transfer arms 334 each having two teeth like the teeth of the segment 312. These arms are in the plane of the segments.

The transfer tripping mechanism associated with these arms 334 for the three totalizer lines is the same as that fully described in the patents previously referred to.

Associated with the differential mechanism is a beam 335 (Fig. 7) pivoted on a stud 336 carried by the plates 313.

The beam has a slot 337 receiving a pin 338 on a link 339 pivoted to a segment 340 which is a part of the indicating mechanism, not shown here, but clearly illustrated and described in the above mentioned Shipley application. This link is connected to an arm 341 by a pin 342. This arm is secured to one end of a sleeve 343. There is one of these sleeves for each amount bank supported by a rod 344 journaled in the frame of the machine. The function of these sleeves will hereinafter be described in connection with the printing mechanism.

*Differential—transaction bank*

The differential mechanism which cooperates with the transaction keys is similar to that used with the amount banks, except that the differentially movable segments 312 and plates 313 (Fig. 7) are omitted and are replaced by an arm 286 (Fig. 11) pivoted on the hollow stud 311. The arm 286 carries a latch device which is identical with that described in connection with the amount differential mechanism. This latch device connects the arm 286 to a driver 351, of the same construction as the driver 310 associated with the amount bank.

The driver 351 of this bank is operated by mechanism identically the same as that which operates the driver 310 associated with the amount banks. This mechanism includes the link 352, and the lever 353 carrying rollers 354 and 355 cooperating with cams 356 and 357 fixed on the shaft 56. To the arm 286 is pivoted the usual beam 358 bifurcated to surround a pin 359 on a link 360 associated with the transaction bank. The beam 358 is operated in the usual way by a roller 361 on the lever 353 engaging the lower edge of said beam. The link 360 is connected at its upper end to the indicator actuating mechanism and at its lower end to a stud 362 carried by an arm 363 secured to the inner sleeve 343 on the rod 344 which actuates a type carrier in the printing mechanism. The rocking of the arm 363 also selects the classification totalized for engagement with the actuating segment, all of which will hereinafter be described.

Totalizers

The machine illustrated has nine totalizers (Figs. 44 and 45), arranged on three lines. The upper line (Figs. 7 and 45) contains but one totalizer, which is used for accumulating the totals of the "multiple item" transactions. This totalizer is controlled by the "multiple item" keys 97, so that during any operation of the machine with a key 97 depressed, this upper totalizer line is rocked into mesh with the actuator. Thus, during any adding operation, with a "multiple item" key 97 depressed, the amounts are added into this totalizer. A total is printed of all the items of a "multiple item" transaction which are entered into this totalizer, and therefore, this upper totalizer is rocked into engagement with the actuators to control the adjustment of the printing elements, as later described, and the totalizer is simultaneously turned to zero, as is well known in the art. Thus, after each complete entry of a "multiple item" transaction, and the total printing thereof, the upper totalizer is turned to zero, so that this totalizer will be ready for the next "multiple item" transaction.

Depression of a "single item" key 98, controls the totalizer engaging mechanism for the upper totalizer so that it is not engaged with the actuators during the operation of the machine, and therefore, the amounts of the "single item" transactions are not entered into the upper totalizer.

Figure 44:
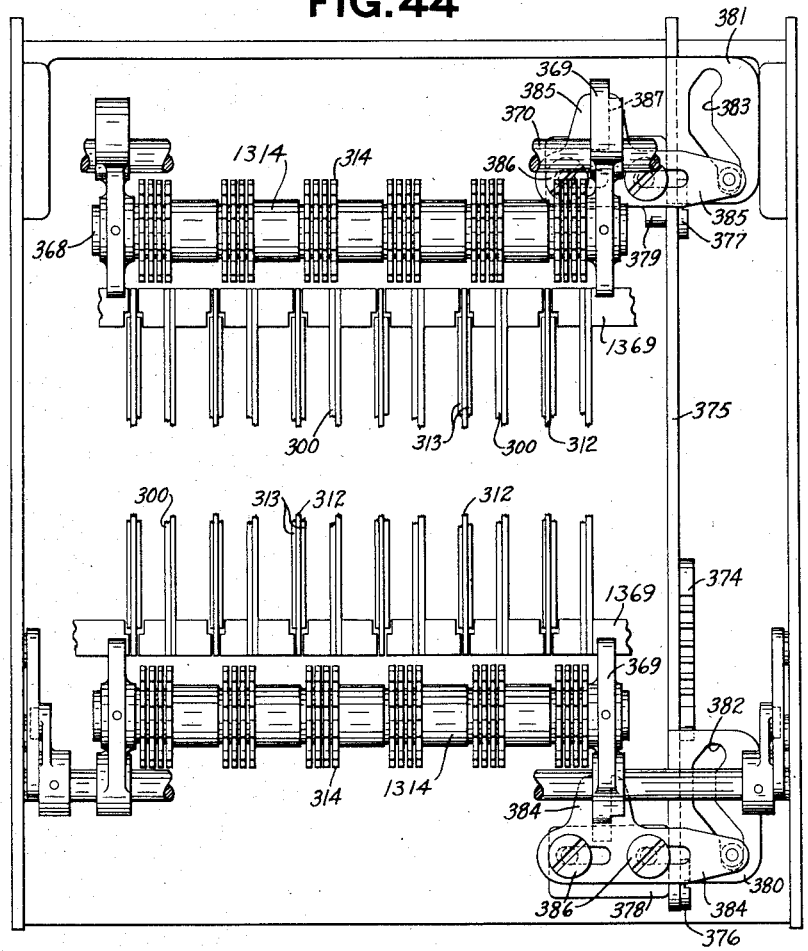
Fig. 44 is a top plan view of the transaction totalizers, together with the shifting mechanism therefor.

The front totalizer line has four totalizers thereon (Fig. 44). These totalizers are used for accumulating totals for an extended period of time, and for illustration, will be known herein as the "weekly totals." There is one totalizer on this line for each class of transaction represented by the transaction keys 97 and 98, namely, "Cash," "Charge," "Received-on-Account," and "Paid-Out."

The back totalizer line also has four totalizers thereon, one for each classification, the same as the front lines.

Both the front and back totalizer lines are shifted under control of the transaction keys 97 and 98 to bring the proper totalizer into alignment with the actuators, as will be later more fully described. Both the "multiple item" cash key 97 and "single item" cash key 98, control the front and back totalizer lines to align the cash totalizers with the actuators, so that if either one of these two keys is depressed, and the machine operated, the amount of the item set up on the keyboard is added into the cash totalizers on both front and back totalizer lines. The "charge" totalizers are selected by both the "multiple item" charge key 97 and the "single item" charge key 98. The "paid out" key 98 and "received-on-account" key 98 each selects its appropriate totalizer. Thus depression of any of the transaction keys will select the appropriate totalizers on each of the front and back totalizer lines.

The mechanism for meshing the front and back totalizers which have been selected by the depressed transaction key with the actuator, is controlled so that these two totalizers will be moved into mesh with the actuators during every item entering operation, in order that every item entered into the machine will be entered into the appropriate totalizer. However when taking totals, any one of the totalizer lines can be selected by moving the total control lever to the proper position.

Each of the above mentioned in connection with the description of the differential mechanism, includes pinions 314. These totalizers are of the same type as illustrated in the patent to W. A. Chryst, No. 1,230,864, dated June 26, 1917, and patents to F. L. Fuller, No. 1,242,170, dated October 9, 1917, and No. 1,394,256, dated October 18, 1921. In Fig. 11 the transaction totalizer carrying frames are illustrated. As the frames are practically the same as those illustrated and described in the Fuller Patents Nos. 1,242,170 and 1,394,256, only a brief description will be given herein. Each set of totalizer pinions 314 (Fig. 7) is loose on a tube 368 carried by two arms 369 (Fig. 11) mounted on opposite ends of the tube and slidably mounted on a shaft 370. The upper ends of the arms 369 are slotted to engage blocks 1369 (Figs. 44 and 45), secured to arms 371 on the hangers 299 and 300 by means of which the arms 369 are prevented from turning on the shaft 370. Connecting each pair of arms 369 is a rod 372 which spaces the two arms the proper distance apart. The two arms, the rod 372 and tube 368 form a frame which is slidable on the shaft 370 for the purpose of bringing any desired set of pinions 314 into operative relation with the differential segments 312, as is old and well known in the art, and which is described in Fuller Patents Nos. 1,242,170 and 1,394,256.

Figure 23:
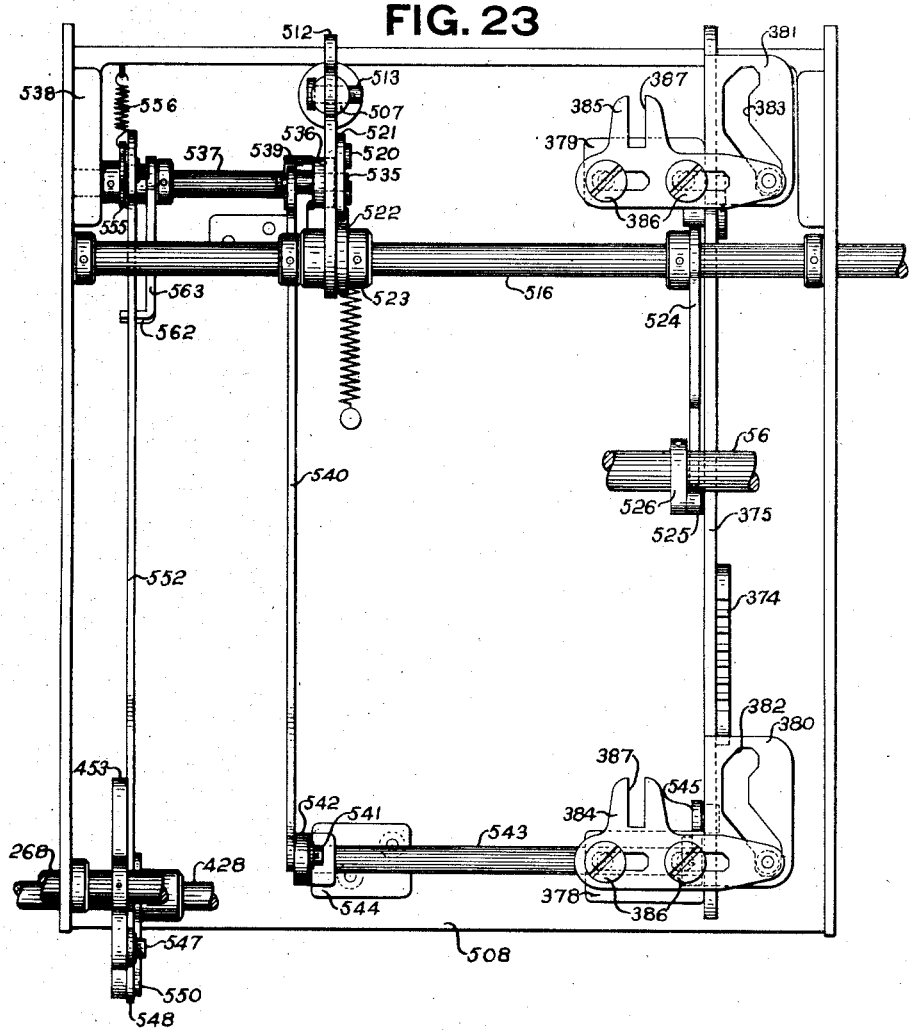
Fig. 23 is a plan view of the drawer-opening mechanism and also the totalizer selecting mechanism.

The front and back totalizer lines, each with their four totalizers are moved laterally by the differential mechanism under the control of the transaction keys 97 and 98, which differential mechanism controls the rocking of the inner sleeve on rod 344 (Fig. 11), as previously described. Secured to this sleeve is a gear segment 373 meshing with a rack 374 secured to a slidable bar 375 supported by screw studs 376 and 377 mounted in brackets 378 and 379 supported by the base of the machine. The bar 375 has two flanges 380 and 381 (Figs. 23 and 44) formed at right angles to the bar and having slots 382 and 383 respectively, which are formed to give a lateral movement to totalizer shifting bars 384 and 385 to move the front and back totalizer lines laterally into positions determined by the transaction keys. The bars 384 and 385 are guided in their lateral movements by screw studs 386 projecting through elongated openings in said bars and screwed into the brackets 378 and 379. Slots 387 formed in bars 384 and 385 receive the lower ends of the arms 369 (Fig. 11), which are part of the totalizer frames, as previously described.

Figure 45:
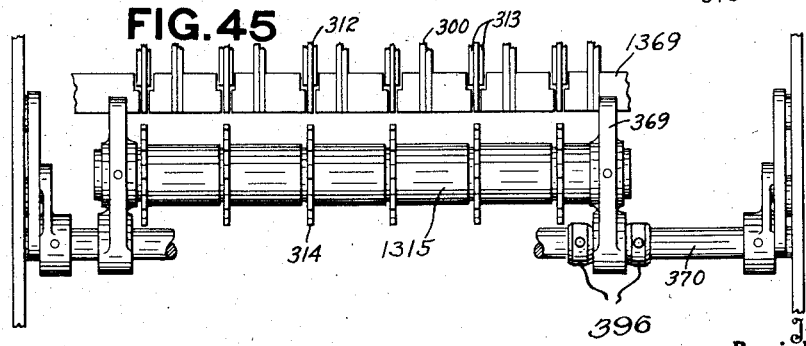
Fig. 45 is a plan view of the "multiple item" transaction totalizer.

The various groups of totalizer wheels 314 are retained in their lateral positions by spacing collars 1314 and 1315 (Figs. 44 and 45). These wheels are prevented from rotating while the totalizer frame is in its home position by an alining bar 391 (Fig. 11) hinged on two levers 392 fulcrumed on the rod 372 and held in lateral position on the rod by collars (not shown).

The mechanism for engaging and disengaging the totalizer pinions with the differential segments 312 is not shown here, but is the regular mechanism and is clearly illustrated and described in the patents and application previously referred to.

When the shaft 370 (Fig. 11) is rocked counter-clockwise to engage the totalizer pinions with the differential segments, a pawl 393 fastened to said shaft 370 engages a shoulder 394 on the lever 392 and rocks the lever counter-clockwise, and withdraws the alining bar 391 from the pinions, allowing the selected pinions to be rotated. The remaining pinions, being in engagement with the lugs 1369 (Figs. 44 and 45), fastened to the arms 371 on the hangers 299 and 300, are prevented from turning with the pinions in engagement with the differential segments. When the totalizers are moved out of engagement, the pawl 393 strikes the edge 395 of the lever 392 and rocks said lever clockwise to normal position, thereby engaging the alining bar 391 with the totalizer pinions 314.

The multiple item transaction totalizer line occupies a position above the differential mechanism in Figs. 7 and 11, and is of practically the same construction, and has the same operation as the other totalizer lines hereinbefore described except that it includes but one set of totalizer pinions 314 (Fig. 45), which are always in alinement with the differential segments 312. The totalizer frame is held in lateral position by collars 396 fastened to the shaft 370. The wheels or pinions 314 of this totalizer are returned to zero or normal positions in the usual way as described in the previously named patents when the total of a multiple item transaction is printed.

*Totalizers—engaging controlling mechanism*

When the machine is operated in registering single-item transactions, the front and back totalizer lines are rocked into engagement with the differential mechanism simultaneously. When registering multiple item transactions, all three totalizer lines are rocked into engagement with the differential mechanism simultaneously, and when totalizing the items of a multiple-item transaction the upper or single totalizer line only is rocked into engagement with the differential mechanism. When taking sub-totals or grand totals of the lower back totalizer line, which may be called "daily totals", only this line of totalizers will be rocked into engagement with the differential mechanism, and when taking sub-totals or grand totals of the lower front totalizer line, which may be called "weekly totals", only this line of totalizers will be rocked into engagement with the differential mechanism.

After the lower front and back classification totalizer lines have been shifted to position totalizers to be operated by the differential segments 312, the selected totalizer pinions 314 are rocked into mesh with said segments.

The mechanism used to engage the various totalizer lines with the differential segments being standard construction, is not shown here, but is clearly illustrated and described in the Shipley application, Serial No. 608,281, previously referred to.

*Indicators*

The indicating mechanism which it is desired to use in connection with the present machine is substantially the same as that fully illustrated and described in United States Letters Patent No. 1,163,748, issued to F. L. Fuller, December 14, 1915. Therefore but a brief description of it will be given herein.

There are two groups of indicators 400 (Fig. 1) for each of the amount banks of keys 91. One group of indicators indicates at the front of the machine and the other group indicates at the back of the machine. There are likewise two groups of indicators 401 associated with the transaction keys 97 and 98.

The selection of the indicators is determined by the differential position of the segment 340 (Fig. 7), which is controlled by the differential mechanism of each unit. These segments are mounted on telescopic sleeves 402 and a shaft 403, and held in alinement by the usual aliner 404 engaging notches 405.

Transaction counters

The machine illustrated has seven special counters, one for each of the transaction keys 97, 98 and 406, upon the appropriate one of which, "one" is added every time the machine is operated with a transaction key depressed, thus counting the number of items entered into the machine, and two additional special counters to register the number of complete cash and charge multiple-item transactions. These latter two special counters have "one" added therein only upon operations of the machine during which a total of a "multiple item" transaction is printed. Thus at the end of a given period of time, the proprietor can determine the number of items sold and also the number of sales made. These counters are of the same type as those illustrated in the patent to Fuller, No. 1,394,256, previously referred to. These special counters are located near the left hand side of the machine under the cover 187 (Fig. 1), and are mounted in a frame 407 (Fig. 15) supported at its upper and lower ends upon the rods 93 which support the key banks on the machine, as has been previously described. The counters are of the usual rotation type, and are supported upon shafts 408 secured within the framework 407. The wheels of the counters are moved step by step by the usual tined pawls, to which are pivoted links 409, pivoted at 410 to links 411. Within the slots of the links 411 fit pins 412 carried by the counter frame. The pivotal points 410 between the links 409 and 411 comprise pins each of which fits within a slot 413 in a reciprocating operating bar 414, pivoted at its upper end at the point 415 to an arm 416 pivotally supported at 417 by the frame 407, and at its lower end is supported by a pivotal connection 418 with a lever 419, which is itself pivotally supported at 420 upon the counter frame. The lever 419 carries a pin 421 which fits within the bifurcated end of an arm 422 loosely mounted upon the rod 301 passing through the frame. The arm 422 carries a stud 423, upon which is pivoted a link 424, the lower end of which carries a pin 425 (Fig. 16) engaging a right angle opening 426 formed in an arm 427 pinned to a shaft 428 supported in the frames of the machine. This shaft 428 is rocked at each cycle of operation of the machine by a cam 433 (Fig. 3) formed in the gear 55. Cooperating with this cam is a roller 434 carried by a pitman 435 which is pivoted at its forward end by a stud 436 to an arm 437 pinned to the shaft 428. As the shaft 428 is rocked it will cause the arm 427 (Figs. 15 and 16) to rock and, when the link 424 is in its normal position, as shown, the arm 422 will be caused to rock counter-clockwise and move the operating bar 414 in a downward direction to operate the special counters corresponding to the transaction key depressed.

The transaction keys, through the differential mechanism, control the selection of a special counter to be operated. Referring to Fig. 11, the indicator selecting segment 340, which is operated by the differential mechanism of the transaction bank, is pinned to the shaft 403. Also pinned to the shaft 403 near the left hand side of the machine is an arm (not shown here), pivotally connected by a link 445 (Fig. 15) to a stud 446 carried by the lower end of a lever 447 whose hub 1447 is freely mounted on a stud 438 supported by the frame of the machine. The upper end of the lever 447 carries a movable bar 439 which is supported and guided on the lever by studs 440 and 441 engaging elongated openings formed in the bar. The lower end of the bar 439 is maintained at all times in engagement with a cam 442 connected by a hub 443 to an arm 444, which will hereinafter be described. The hub 443 pivots upon the hub 1447 of the lever 447.

As the lever 447 is moved to its various positions, controlled by the differential mechanism of the transaction bank, the bar 439 is placed beneath one of the various slotted links 411 (Fig. 15), and as the operating bar 414 is moved to the left and downward the slotted link 411 will engage the upper edge of the bar 439 and cause the toggle formed by the links 409 and 411, to straighten and move the tined pawl a sufficient distance to actuate the selected counter. The other transaction counters do not add at this time, as the links 411, being unobstructed, move downwardly with the upper ends of the links 409 as their pivots, guided by the pins 412 in the elongated openings, and consequently the tined pawls are not actuated, all of which is clearly illustrated in the above mentioned Fuller Patent No. 1,394,256.

When the machine is operated under control of any of the transaction keys, and the total or control lever 271 is in the add position, the bar 439 (Fig. 15) will cooperate with the counter actuating mechanism to add one on the counter selected from the counters 448, 451 or 452.

Single-item transactions are registered by the counters 448. The number of cash and charge items of multiple-item transactions is registered by counters 451 and 452. The number of cash and charge multiple-item transactions or item total operations are registered by the counters 449 and 450.

In totalizing multiple-item charge transactions, the control lever 271 (Fig. 1) is moved downward to the item total position, which will cause the shaft 268 (Figs. 14 and 15) to be rocked clockwise 15° by mechanism hereinbefore described. Pinned to the shaft 268 (Fig. 15) is a bell crank lever 453, which is connected by a link 454 to the arm 444, previously described. The initial movement of the shaft 268 by the control lever 271 will disable the transaction counter operating mechanism so as not to operate a transaction counter twice in a totalizing operation of the machine, which requires two cycles of operation. For this purpose the bell crank lever 453 is provided with an angular slot 456 which actuates a pin 457 in a three-armed lever 458 pivoted on the shaft 428. The initial movement of the shaft 268 will cause the pin 457 to move to the low part of the slot 456, which will cause a counter-clockwise movement of the lever 458, and as the lower arm 459 of the lever 458 is in contact with a pin 460 on a lever 461 the upper end of which carries a pin 462 entered in a slot 463 in the link 424, the link 424 will be moved clockwise on its pivot 423, thereby elevating the pin 425 (Fig. 16) carried by its lower end to an ineffective position with respect to the angle slot 426. Therefore, the movement of the shaft 428 during the first cycle of operation does not affect the transaction counter operating mechanism. A spring 464 (Fig. 15) attached to the lever 458 and to the lever 461, returns the link 424 and the lever 461 to their normal positions whenever the totalizing lever 271 is returned to the add position. Near the end of the first cycle of operation of a totalizing operation, the shaft 268 is given an additional clockwise movement by a cam 470 (Fig. 3) which cooperates with a roller 471 carried by a pitman 472, the lower end of which is pivotally connected to a lever 473, pivoted on the stud 292. The left hand end of the lever 473 is connected by a link 475 to an arm 474 pinned to the shaft 268. The cam 470 is freely mounted on the stud 54 and is normally retained in an inoperative position by the roller 471 being in a notch 476 formed in the cam. As the shaft 268 receives its initial movement, as hereinbefore described, the roller 471 is withdrawn from the notch 476 and into the cam 470. At the same time, a coupling bar 477 is shifted to lock the cam 470 to the gear 53 and cause them to rotate in unison, all of which is clearly illustrated and described in the above mentioned patents. The shifting of the pitman 472 will, through a stud 478 cooperating with a slot 479, cause the link 124 to move clockwise to position the opening 294 into ineffective relation with the pin 293 so that the release shaft 70 will not be returned to its normal position until the second cycle of operation, all of which is old in the art.

The second movement of the shaft 268 will give further movement to the bell crank lever 453 (Fig. 15) and cause the pin 457 to continue its travel in the slot 456 and return the lever 458 clockwise, which will permit the lever 461 and the link 424 to return to their normal positions, which again places the pin 425 (Fig. 16) at the bottom of the angle opening 426, in which position the transaction counter operating mechanism is again effective to operate the selected counter.

During the second movement of the shaft 268, the bell crank lever 453 rocks the arm 444 and its associate cam 442 counter-clockwise a sufficient distance to allow the spring-pulled bar 439 to leave the higher edge 455 on the cam 442 and engage the lower edge 1455, thus rendering the bar 439 ineffective relative to the slotted counter links 411. At the same time, an angle edge 480 on the arm 444 contacts a pin 481 carried by an arm 483 and normally resting on a projection 482 of the lever 447, and rocks the arm 483 clockwise on its pivot 440, thus moving said arm 483 into an effective position relative to the slotted link 411 of the counter 450. With the arm 483 in its elevated position the counter 450 will be operated during the second cycle of operation of the totalizing operation.

The operation of the counter 449, which records the number of multiple cash transactions, is similar to that of the charge counter 450 just described. The only difference in operation is that the lever 447 will be moved by the differential mechanism one position in a counter-clockwise direction to place the arm 483 in its proper relative position to the slotted link 411 of the counter to be operated.

When the totalizing lever 271 (Fig. 1) is moved either to the first or second positions above the add position, or the second or third positions below the add positions, the transaction counters operating mechanism is disabled for the reason that it is not desirable to operate transaction counters during such operations.

Secured to the totalizing lever 271 (Fig. 14) is a block 487 contacted by a roller 488 carried by a lever 489 pivoted upon the stud 301. The block 487 is of such form as to cause the lever 489 to move clockwise on its fulcrum when the totalizing lever is moved into any of the above mentioned positions. The lower end of the lever 489 is bifurcated to cooperate with a roller 490 carried on arm 491 pinned to the shaft 344 which is supported in the frame of the machine. Secured to and moving with the arm 491 is a cam arm 493 (Figs. 14, 15 and 16) normally contacting a pin 494 carried by a lever 495 pivoted on the shaft 428. The lower arm 496 of the lever 495 is in contact with a pin 497 carried by the lever 461 previously described. The upper edge of the cam arm 493 is formed to move the lever 495 counter-clockwise as the cam arm 493 moves in a corresponding direction. This movement of the arm 496 through the lever 461 will raise the lower end of the link 424 and move the pin 425 into the wide portion of the slot 426, thus uncoupling the link 424 from arm 427, thereby disabling the transaction counters operating mechanism. A spring 498 attached to the cam arm 493 and the frame of the machine holds the roller 488 (Fig. 14) in contact with the block 487 secured to the totalizing lever 271. A foot 499 on the cam arm 493 is adapted to contact a stud 500 to limit the counter-clockwise movement of the cam arm 493 and its associated parts.

The transaction counters are each provided with the usual reset pawls which are actuated by knurled knobs 501 (Fig. 15) for setting the counter wheels to zero.

Cash drawer

The cash drawer is operated during each single-item registration, and also during a totalizing operation.

The cash drawer 506 (Figs. 21, 22 and 23) is normally retained in inaccessible position by a plunger 507 mounted in a base 508 of the frame and is urged into functioning position by a spring 509 coiled about the plunger between a pin 510 on the plunger and the base. A collar 511, secured to the plunger above the base, limits the downward movement of the plunger. In the upper end of the plunger is a vertical slot, within which the drawer plunger lever 512 freely operates. A horizontal pin 513 secured in the plunger extends through an enlongated opening 514 formed in the drawer plunger lever. The opening in the drawer plunger lever is elongated for the purpose of permitting the plunger to rise when the cash drawer is closed without moving the lever and also to allow a greater movement of the lever than that required to lift the plunger. The lower end of the plunger 507 enters an opening in a bracket 515, secured on the back of the cash drawer, to retain the cash drawer in the inaccessible position.

Figure 21:
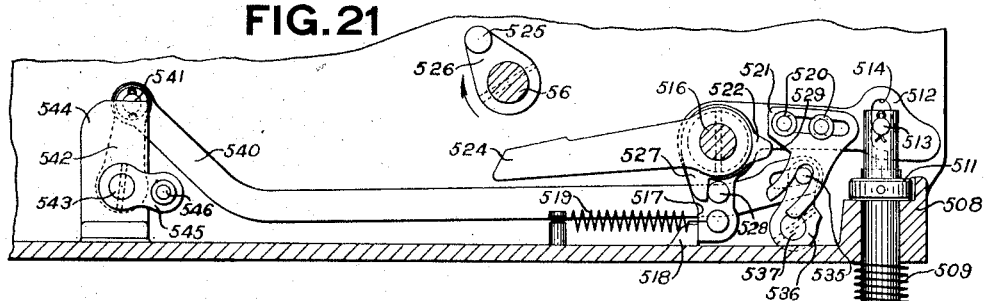
Fig. 21 shows the mechanism under control of the transaction bank of keys for opening the drawer, and set for a multiple-item transaction.
Figure 22:
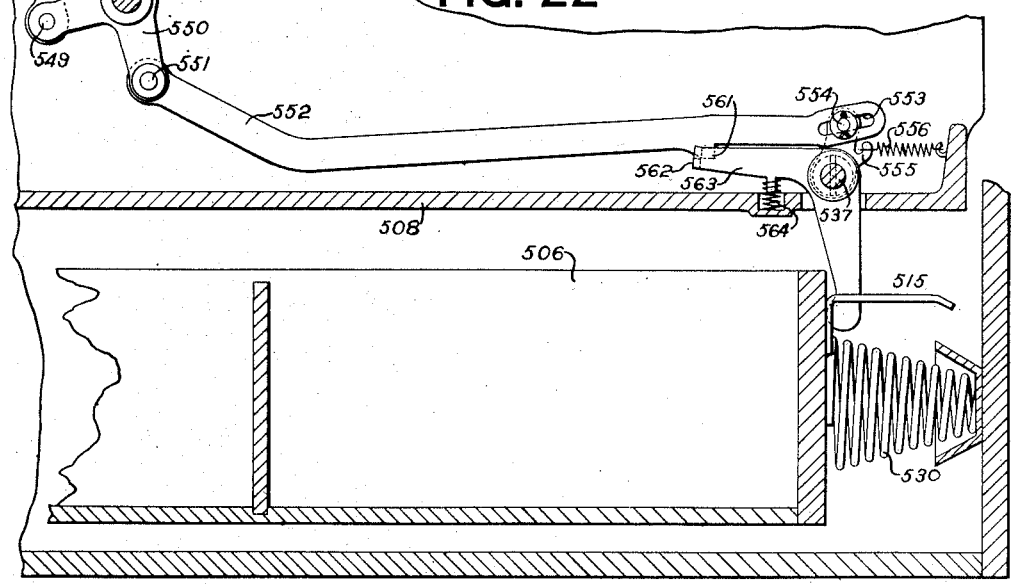
Fig. 22 shows the mechanism to prevent the restoration of the total lever to the "add" position until after the drawer is closed.

The drawer plunger lever 512 is pivoted upon a shaft 516 and has a downwardly extending arm 517 normally held in contact with a lug 518 on the base 508 by a spring 519 attached to the arm 517 and to the base. Slidably mounted upon studs 520 carried by the lever 512 is a coupling link 521 adapted to cooperate with an operating arm 522 provided with a hub 523 (Fig. 23) pinned to the shaft 516, to operate the drawer plunger lever 512. Secured to the shaft 516, near the right hand side of the machine, is an arm 524 adapted to be in or out of cooperating position with a laterally projecting pin 525 carried by an arm 526 secured to the driving shaft 56. Referring to Fig. 21, the arm 524 is shown in its ineffective position with a downwardly extending finger 527 on the operating arm 522 engaging a pin 528 carried by the drawer plunger lever. When the parts are in the positions shown in Fig. 21, the drawer releasing mechanism is ineffective. As the coupling link 521 is moved toward the left by mechanism to be described hereinafter, a cam edge 529 thereon contacts the operating arm 522 and moves the shaft 516 slightly clockwise to shift the forward end of the arm 524 into the path of the pin 525, thus rendering the releasing means effective. As the shaft 56 rotates during the operation of the machine, the arm 524 is moved counter-clockwise, and through its associated parts withdraws the drawer plunger 507 from the opening in the bracket 515 to permit the drawer 506 to move into an accessible position under the influence of a spring 530 (Fig. 22).

Mechanism will now be described which slides the coupling link 521 to the left to rock the arm 524 clockwise into its effective position. The coupling link 521 (Fig. 21) is bifurcated and embraces a pin 535 carried by an arm 536 pinned to a shaft 537 which is supported at one end in a lug 538 (Fig. 23) and at the other end in a bracket 539 secured to the base of the machine. The pin 535 extends through the arm 536 (Fig. 21) and projects into an elongated opening in a pitman 540. At its left hand end the pitman is connected to an arm 542 by a stud 541. The arm 542 is pinned to a shaft 543 supported in the bracket 378 and a bracket 544 (Fig. 23) mounted on the base of the machine. Secured to the right hand end of the shaft 543, is an arm 545 carrying a roller 546 projecting into a cam slot 547 in the differentially shiftable bar 375 (Fig. 11). This bar 375 is actuated by the differential mechanism of the transaction bank, as hereinbefore described. In a multiple-item transaction, with either of the transaction keys 97 depressed, the bar 375 (Fig. 11) will be moved toward the left to a position wherein the roller 546 will engage the right hand end of the slot 547 and cause a clockwise movement to be given to the shaft 543 which will move the coupling link 521 (Fig. 21) to the ineffective position, as shown. If one of the single-item transaction keys 98 is depressed, the roller 546 will be in the left hand end of the slot 547, as shown in Fig. 11, and the shaft 543 (Fig. 21) will be moved counter-clockwise and move the coupling link 521 toward the left and elevate the arm 524 to a cooperating position with the pin 525, and during the operation of the machine the pin 525 will engage the arm 524 to rock the shaft 516 counter-clockwise, and through the engagement of the operating arm 522 with the cam edge 529 cause the drawer plunger lever 512 to move counter-clockwise and release the cash drawer.

The cash drawer is made accessible on all totalizing operations and will open during the second cycle of operation. As the total lever is moved from the add position to any of the totalizing positions, the shaft 268 (Figs. 14 and 22) receives an initial movement in a clockwise direction, as hereinbefore described. The lever 453 is connected by a link 548 at 549 to a bell crank lever 550 pivoted on the shaft 428. This bell crank lever is connected at point 551 to a pitman 552, which has an elongated opening 553 in its right hand end engaging a pin 554 carried by an arm 555 pinned to the shaft 537. The initial movement of the shaft 268 will move the pitman 552 toward the left without giving any movement to the arm 555, which is retained in normal position by a spring 556. As the shaft 268 receives additional movement during the total taking operations of the machine, as hereinbefore described, the pitman 552 will receive a like movement, at which time the right hand end of the slot 553 being in engagement with the pin 554 will cause the arm 555 to move counter-clockwise and rock the shaft 537, which through the pin 535 (Fig. 21) moves the coupling link 521 into cooperating position with the operating arm 522, thereby causing operation of the drawer plunger during the second cycle of operation of the machine.

An interlock is provided to compel the closure of the cash drawer before the total lever can be returned to its "add" position. When the totalizing lever is moved from the add to any of the totalizing positions and the shaft 268 receives its initial movement, a shoulder 561 (Fig. 22) formed on the link 552 will pass to the left of a lip 562 on a bell crank lever 563, pivoted on the shaft 537 and normally held in engagement with the cash drawer 506, by a spring 564. As the cash drawer moves forwardly, the bell crank lever is moved clockwise by the spring 564, thus moving the lip 562 behind the shoulder 561 of the pitman 552, in which position the totalizing lever 271 cannot be returned to the adding position, making it necessary to return the cash drawer to its normal inaccessible position before entering further items.

*Printer*

The printing mechanism is located on the left hand side of the machine proper, and prints and issues a receipt 150 (Fig. 5) for single-stem transactions, and a receipt 151 (Fig. 6) for multiple-item transactions, containing the date, consecutive number of the transaction, the amount of each item entered in the transaction, together with the total of the same, characters representing the class of transaction, the initial of the clerk, and other selected data. In single-item transactions it is not necessary to make a total print, as in a multiple-item transaction. In addition to the receipt, a total record strip 149 (Fig. 4) is printed and retained within the machine. The record strip shows the amount of each single-item transaction and the total of each multiple-item transaction, together with the classification character and clerk's initial.

In entering "multiple item" transactions, all the items for a given transaction must be of the same character. For example, "Cash" and "Charge" items cannot be printed on the same receipt. If a customer purchases a number of articles for which he pays cash and a number of articles which he has charged, two receipts are issued, one containing an itemized list and total of the "Cash" items, and the other an itemized list and total of the "Charge" items. The character printed with the total on the receipt shows which receipt is for the "Cash" articles, and which receipt is for the "Charge" items.

The nested sleeves 343 (Figs. 7 and 25), actuated by the arms 341 (Fig. 7) and arm 363 (Fig. 11) controlled by the differential mechanisms, as previously described, support at their left hand ends segments 568 (Fig. 25) which mesh with teeth 569 of segment levers 570 pivoted upon a stud 571 on the frame 572. The upper ends of the segment levers 570 have teeth 573 in mesh with teeth 574 of partial gears 575 secured to nested sleeves 576 and a rod 577 supported by the left hand frame of the machine and the printer frame 572. Secured to the left hand ends of the sleeves 576 and rod 577 are item type printing wheels 578 (Figs. 31, 32 and 34), and a transaction character wheel 579. Each type-wheel has two sets of type characters to permit impressions being taken from the upper and lower sides of the wheels. The upper side prints upon the issuing receipt and the lower side upon the total record strip.

After the type printing wheels have been adjusted under control of the differential mechanism, they are retained in proper alinement at the time of making the records by an alining arm (not shown) cooperating with notches 580 formed in the partial gears 575 (Fig. 25). This alining arm and its operating mechanism are shown in the Shipley application previously referred to.

Figure 29:
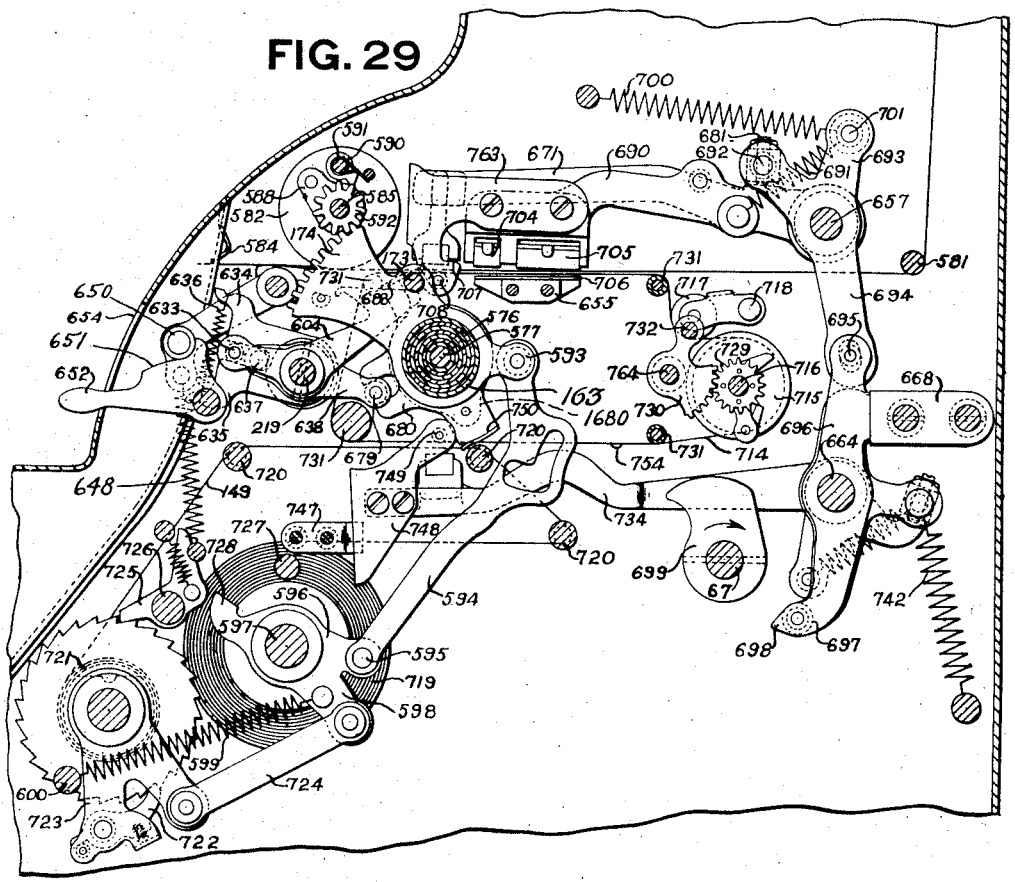
Fig. 29 is a section through the printer.

The issuing receipts 150 and 151 are fed from a supply roll (not shown) around a guide rod 581 (Fig. 29) between impression hammers and various type wheels and between a feed roller 582 (Figs. 29 and 30) and a tension roller 583 and past a severing plate 584.

The feed roller 582 is mounted on the stud 585 supported at one end in the printer frame 572. Secured to the roller is a ratchet 586 (Fig. 30), actuated by a feed pawl 587 carried by an arm 588 (Fig. 29) mounted on the stud 585. The pawl is held in contact with the ratchet by a spring 589 and moves the feed roller clockwise to feed the receipt strip into its various printing positions. A spring-actuated pawl 590 mounted on a stud 591 prevents a retrograde motion of the feed roller. Secured to the feed arm 588 (Fig. 29), and moving freely on the stud 585, is a pinion 592 in mesh with the gear segment 174. This segment is loosely mounted on the typewheel sleeve 163 and has a rearwardly extending arm 593 connected by a link 594 and stud 595 to a lever 596 pivoted on a stud 597 projecting laterally from the printer frame 572. The lever 596 has a downwardly extending arm 598 to which is attached a spring 599, which is also attached to a pin 600 projecting from the printer frame 572. This spring 599 is a means for moving the segment 174 (Figs. 25, 27, 28 and 29) in a clockwise direction, and through the pinion 592 meshing therewith, an arm 588 upon which the pawl 587 is carried, moving the feed roller driving pawl 587 (Fig. 30) counter-clockwise around the ratchet wheel 586. The segment 174 is moved counter-clockwise against the action of the spring 599 by a horizontally moving slide 605 (Fig. 25) pivoted by a stud 606 to a lever 607 and guided by a pin 608 projecting from the printer frame. The forward end of the slide 605 contacts the pin 173 on the segment 174. The lever 607 (Figs. 25 and 26) is pivoted on a rod 664 supported by the left side frame of the machine and the printer frame frame 572 (Fig. 33), and has two arms carrying rollers 610 and 611 engaging cams 612 and 613, respectively, secured to the shaft 67. During each operation of the machine the cams 612 and 613 oscillate the lever 607 to shift the slide 605 to the right to permit the segment 174 to be operated by the spring 599, and then return the receipt feeding roller driving segment 174 to its home position, as shown in Fig. 25.

The receipt feeding roller 582 (Fig. 29) operating mechanism is adapted to give a short feed and a long feed to the issuing receipt, governed by a single-item transaction and a multiple-item transaction. The movement of the feed roller when a single item transaction is printed is equal to the greatest movement of the segment 174. The movement of the feed roller when items of a multiple item transaction are printed is equal to the shorter movement of the segment 174, as represented by the spacing of the items shown in Fig. 6. The short feed is controlled by an arm 604 (Figs. 25 and 27) pivoted on the shaft 219 and is operated by a flexible drive on account of the overlapping of time in operation of the different mechanisms that operate the segment 174 and the arm 604. The arm 604 has a laterally projecting pin 633 (Fig. 29) projecting between arms 634 and 635 held in contact with the pin 633 by a spring 636. These arms are driven by a pin 637 carried by a lever 638 secured to the shaft 219. When the arm 604 is moved counter-clockwise to the position shown in Fig. 27, the hook portion of the arm is in the path of a flat-sided pin 614 carried by the segment 174, which will limit the movement of the segment to give a short feed to the issuing receipt. The arm 604 is placed in the short feed position by mechanism controlled from the transaction keys 97.

Secured to the segment lever 570 (Fig. 25) of the transaction bank is a cam arm 615. The cam arm 615 is adjusted under control of the transaction keys 97 and 98. The outer edge of the cam arm 615 contacts a roller 616 carried on arm 617 loose on the shaft 219 (Figs. 27 and 28). The cam arm 615 has a low edge 620 (Fig. 27) and a high edge 621. In single-item transactions the roller 616 engages the high edge 621 of the cam arm, as shown in Fig. 25, with the hooked arm 604 in an ineffective position in relation to the pin 614. As the cam arm 615 is moved counter-clockwise for a multiple-item transaction, the roller 616 passes from the high edge 621 to the low edge 620 on the cam arm, under the tension of a spring 622. The spring 622 is stretched between a stud on the frame 572 and a stud on the before-mentioned bell crank 221. The bell crank 221 is pinned to the shaft 219 and therefore, movement of the bell crank 221 causes movement of the shaft 219. A stud 629, carried by a link 628, projects through a slot 631 in the bell crank 221 and a slot 630 in the arm 617 to couple the bell crank 221 and the arm 617 together, so that any movement of the arm 617 by the cam 615 is transmitted to the shaft 219 by the bell crank 221, and any movement in the reverse direction imparted to the bell crank 221 by the spring 622 under control of the cam 615, is also transmitted to the shaft 219. As the roller 616 passes from the high edge 621 to the low edge 620 of the cam, the hooked arm 604 is moved into the path of the pin 614, which limits the movement of the segment 174 to give a short feed to the feed roller.

After the last item is printed, the totalizing lever 271 (Fig. 14) is manually moved to the item total position, which movement of the total lever through cam slot 272, lever 273, arm 276, roller 277 and arm 278 gives an initial movement to the shaft 268 (Fig. 28), as hereinbefore described.

Secured to the shaft 268 is an arm 623 connected to a pitman 624 guided by the shaft 219, and carrying a roller 625 which engages an arm 626 pinned to the shaft 219. By this means the initial manual movement of the shaft 268 rocks the shaft 219 clockwise, which places the hooked arm 604 in the position shown in Fig. 28, before the machine is released for a total taking operation. As is well known, a total taking operation, by a machine of the type disclosed herein, consists of two complete cycles. During the first cycle of such a total taking operation, the arm 604 remains in the position shown in Fig. 28 to control the feed segment 174, to space the last printed item from the printed total as shown in Fig. 6. It being understood that, although this short feed takes place during this first cycle of operation, the printing mechanism does not operate.

Near the end of the first cycle of the total taking operation, the control arm 604 moves clockwise from the position in which it is shown in Fig. 28, to withdraw it from the path of the stud 614 to permit the segment 174 to receive its full extent of movement during the second cycle, to feed the printed receipts out of the machine in a manner hereinafter described.

The control arm 604 is moved to such withdrawn position when the shaft 268 (Fig. 3) receives its additional movement by the cam 470 near the end of the first cycle of operation, in the manner hereinbefore described. Such additional movement of the shaft 268, through arm 623, pitman 624, and stud 625 on the pitman 624, cams the arms 626 farther clockwise to move the hook arm 604 out of the path of the stud 614 to permit a long feed during the second cycle of the total-taking operation.

*Clerks' special counter control—multiple-item total printing operation*

As hereinbefore mentioned, when entering a multiple-item transaction, the selecting bar 211, Fig. 20) is moved toward the right during the operation in which the first item of such a transaction is entered. When in such right-hand position the obstructions 212, 213, 214 and 215 are out of the path of the links 190, and therefore, nothing can be added into the special counters during such item entry operations.

The positioning of the selecting bar 211 into such ineffective position is accomplished by the cam arm 615 (Figs. 25, 27 and 28). When a multiple-item key 97 is depressed, the edge 620 of the cam arm 615 moves beneath the roller 616 to permit the spring 622 to rock the arm 221 into the position shown in Fig. 27. The arm 221 is therefore moved from the position shown in Fig. 20 to the right to shift the selecting bar 211 into its ineffective position.

The cam arm 615 is 'beam' set, and therefore remains in the adjusted position as long as a multiple-item key 97 is depressed. In the present machine, when entering a multiple-item transaction, the depressed key 97 remains depressed until the transaction has been entered and the total of the transaction is printed.

As explained above, when taking a total of a multiple-item transaction, the total lever 271 (Figs. 1 and 14) is moved from the 'Add' position to the 'Item Total' position, and when so doing the shaft 268 receives its initial adjustment to rock the arm 626 (Fig. 27) clockwise, through the arm 623, pitman 624, and stud 625. This movement rocks the arm 221 back towards the position shown in Fig. 20. Upon further movement of the shaft 268 during the total taking operation, as hereinbefore explained, the arm is moved farther clockwise to the position shown in Fig. 20. Then during the operation of the machine when the actuator 199 is operated, '1' is added into the selected clerk's special counter.

*Clerk's special counter—single item entry operations*

During entry of a single item transaction the cam arm 615 shifts the bell crank 221 into the position shown in Fig. 20, in the manner above described, and therefore, when the actuator 199 is operated during a single item transaction entry operation, '1' is added into the selected clerk's special counter.

*Special transaction total printing operation*

As hereinbefore explained, a separate totalizer is provided for each transaction key, that is, 'cash', 'charge', 'received on account' and 'paid out'. The total can be taken from any one of these totalizers by depressing the desired key 98 and adjusting the total lever 271 in the usual and well known manner. During such a total taking operation special provision must be made to control the feed of the receipt paper so that the proper length receipt will be fed out of the machine.

As above described, the length of feed given the check paper is governed by the position of the hooked arm 604, and that this arm is positioned by the cam arm 615. The cam arm 615 is adjusted by the differential mechanism shown in Fig. 11, during the first cycle of a total taking operation. When printing the total from a transaction totalizer a single item key 98 is depressed to select the desired totalizer. By referring to Fig. 25, and the previous description of the control of the hook arm 604 by the cam arm 615, it will be seen that the cam arm 615 is adjusted under control of the single item keys 98 to rock the arm 604 far enough clockwise to move it out of the path of the stud 614, thus permitting the segment to effect a long feed of the receipt. However, it is desired to prevent such a long feed during the first cycle of a special transaction total printing operation, and to obtain this result, means is provided to control the hook arm 604 so that only a short feed will take place during such first cycle of operation. This short feed has no particular significance, it being the result of the structural relation of the controlling elements. However, neither does it do any harm, it merely resulting in issuing a receipt slightly longer than would otherwise be the case. During the first cycle of a total taking operation the pitman 624 rocks the arm 626 and shaft 219 a shorter distance than the arm 626 and shaft 219 are rocked by the cam arm 615. But, since the cam arm 615 is adjusted during the total taking operation, just as it is adjusted during a single item entry operation, the cam arm 615 would strike the roller 616 and rock the arm 617 clockwise during total taking operations, which, through the coupling roller 629, would rock the bell crank 221 and shaft 219 clockwise through a step of movement in addition to that given to the shaft 219 by the pitman 624, and this would rock the arm 604 to the position shown in Fig. 25. To prevent this additional movement of the arm 604 during the first cycle of a total taking operation, means are provided to rock the arm 617 to elevate the roller 616 out of the path of the cam arm 615. This movement of the arm 617 is independent of the movement of the bell crank 221 and shaft 219 and can be effected, since the arm 617 is free on the shaft 219. To accomplish this independent movement of the arm 617, an arm 627, secured to the shaft 268 is connected to the link 628, which carries a roller 629 engaging a slot 630 in the arm 617 loose on the shaft 219, and a slot 631 in the bell crank 221 secured to the shaft 219, to which the spring 622 is attached. As the shaft 268 is given its initial movement the roller 629 travels downward in the slots 630 and 631 and causes the arm 617 to move clockwise to a position in which the roller 616 is clear of the cam arm 615. Thus during the first cycle of a total taking operation, the arm 604 remains in the position shown in Fig. 28, and therefore, during such first cycle of a total taking operation, the receipt strip receives only a short feed. It is desired to give the check a long feed during the second cycle of a total taking operation to feed the printed receipt out of the machine, and to obtain this result it is necessary to rock the arm 604 out of the path of the stud 614 before the second cycle of the machine begins. Near the end of the first cycle of the total taking operation the shaft 268 receives an additional movement by mechanism hereinbefore described. This additional movement of the shaft 268 causes additional movement of the arm 626, which gives additional clockwise movement to the hooked arm 604 and places it in an ineffective position with respect to the pin 614, in which position the segment 174 will be permitted to have its full extent of movement during the second cycle of a total taking operation to give the long feed to the receipt.

The additional movement of the shaft 268 does not cause any additional relative movement between the arm 617 and the bell crank 221, since during this additional movement, the coupling roller 629 is in the lower end of the slots 630 and 631, which lower ends are parallel with each other.

When it is desired to operate the machine without issuing a receipt as may happen when taking a sub-total or grand total from the various totalizers, the lower feed roller 583 (Fig. 30) is moved away from the upper feed roller 582. The lower roller is loosely mounted on a stud 645 carried by a lever 646 pivoted on a stud 647 supported by the printer frame. The lower roller is normally held in contact with the upper roller by a spring 648 attached to the lever 646 and to a pin 649 mounted in the frame.

The lever 646 carries a roller 650, held in engagement with a camming surface 651 of a lever 652 pivoted on a stud 653 on the printer frame. The lever 652 (Fig. 29) projects through an opening in the casing 654, which enables the operator to manipulate the lever at will. Moving the lever clockwise will cause the roller 650 to move up the incline 651 to a shoulder 677, and cause a clockwise motion of the lever 646, which withdraws the lower roller 583 from contact with the upper roller 582. The roller 583 will remain out of contact with the roller 582 until the lever 652 is returned to this lower position by the operator.

The mechanism for printing the date and the consecutive number upon the issuing receipt is not shown here, as it is identical with that shown in the Shipley application previously referred to.

An electroplate for printing the name of the merchant at the top of the receipt and the data at the bottom of the receipt is secured to a bar 655 (Fig. 29) supported by the printer frame 572 and a printer frame cap 656 (Fig. 31).

There are three separate impression hammers for printing the issuing receipt, two of which are shown here, the third one being omitted, as it is a part of the mechanism for printing the date and consecutive number, and, as previously stated, this mechanism is not shown. These hammers are all loosely mounted on a stud 657 (Figs. 29 and 32), supported by the printer frame 573 (Fig. 33). Also mounted on this stud is a frame consisting of an arm 658 (Fig. 33) and a lever 659 tied together by a tie rod 660. The lower arm 661 of the lever 659 has a slot (Fig 32) into which projects a pin 662 carried by a lever 663 pivoted on the rod 664. This lever 663 has a downwardly extending arm 665 carrying a roller 666 adapted to be engaged by a cam 667 secured to the printer driving shaft 67 to cause the lever 659 to move clockwise. The lever 663 is normally held against a block 668 fastened to the printer frame 572 by a spring 678 attached to a pin in the lever and a pin in the printer frame. The cam 667 is of sufficient width to engage both the arm 665 and the roller 666 and, as the cam leaves the roller, it will continue to engage the point 669 of the arm until the shoulder 670 of the cam passes the point 669, when the spring 678 will be free to move the lever rapidly in a clockwise direction, thereby causing an impression platen 676, carried by a hammer 671 to take an impression from the type wheels 578. The hammer bears against an adjusting screw 672 supported in a lug 673 carried by the arm 658 and is so held by a spring 674 attached to the rod 660 and to a pin 675 mounted in the arm of the hammer. The impression platen 676, as shown in Fig. 31, is adapted to take impressions from only the four lowest order item printing wheels 578, as in printing the items of a multiple-item transaction. These four wheels represent the registering capacity of the keyboard. In registering items, the hammer 671 is operated while the other hammers are disabled.

Figure 30:
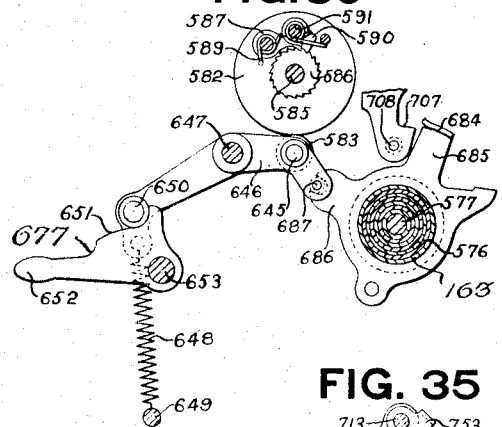
Fig. 30 is a detail of the mechanism for disabling the receipt issuing mechanism.

Means are provided for disabling the impression hammer 671 when no receipt is to be issued. This means includes an arm 682 (Figs. 31 and 32) secured to the hammer, and provided with a shoulder 683 adapted to be engaged by a flange 684 formed on a lever 685 (Figs. 30 and 31). The lever 685 is freely mounted on the telescopic sleeves 576 and has an arm 686 bifurcated to engage a pin 687 carried by the lever 646. Movement of the lever 652 to its upper position causes the flange 684 to be moved over the shoulder 683 of the lever 682 (Fig. 32), in which position the impression hammer frame 658—659 will operate and further expand the spring 674 without moving the impression hammer 671.

The item printing hammer 671 is also disabled during the first cycle of a total-printing operation. As the totalizing lever 271 (Fig. 1) is moved from the add to a totalizing position, and the shaft 219 (Fig. 29) receives its initial movement, as previously described, the arm 638, which is secured to the shaft 219, has a pin 679 engaging a bifurcated projection of a lever 680 pivoted on the telescopic sleeves 576. This lever 680 is is secured to another lever 1680 provided with a flange 688 which passes over the top of a pin 689 on the lever 682 (Fig. 32). Near the end of the first cycle of operation, when the shaft 219 receives its second movement by mechanism previously described, the flange 688 will be moved an additional distance to clear the pin 689 and permit the impression hammer 671 to operate during the second cycle of operation to print the total.

A second impression hammer 690 (Fig. 29) cooperates with the hammer 671 when single-item transactions and totals are printed. The hammer 690 is pivoted on the stud 657 and is normally held, by a spring 691, against an adjustable screw 681 supported by a block 692 secured to a lever 693, also pivoted on the stud 657. The lever 693 has a downwardly extending arm 694 having an elongated opening into which projects a pin 695 carried by a lever 696 pivoted on the rod 664. The lower end of the lever carries a roller 697, which, with an end 698 of the lever, is adapted to be engaged by a cam 699 pinned to the shaft 67. This cam is identical with the cam 667 (Fig. 32) and operates the impression hammer 690 in a similar manner. The lever 696 (Fig. 29) is normally held in engagement with the block 668 by a spring 700 attached to a pin 701 carried by the lever 693 and to a pin projecting from the printer frame 572. The forward end of the impression hammer 690 carries two impression blocks 702 and 703 (Fig. 31) positioned to the right and left of the impression block 676 to engage the transaction and clerks' printer wheels and the two highest order amount wheels. The impression hammer 690 also carries impression platens 704 and 705 (Fig. 29) for taking the impressions from an electroplate 706 mounted on the block 655.

Secured to the right hand side of the impression hammer 690 (Figs. 29 and 31) is an arm 763 having a shoulder 707 and carrying a pin 708. The shoulder 707 cooperates with the flange 684 to disable the impression hammer 690 when the receipt feeding device is disabled by moving the lever 652 to its upper position, as was previously described in connection with the impression hammer 671. The pin 708 cooperates with a flange 1688 on the lever 680 to disable the impression hammer 690 when items of a multiple-item transaction are printed, this flange 1688 being moved over the pin 708 by the rocking of the shaft 219 controlled by the differential mechanism of the transaction bank, as has previously been described. The impression hammer 690 is disabled during the first cycle of operation by which the total of a multiple-item transaction is printed, in the same way that it is when the items of a multiple-item transaction are printed. Near the end of the first cycle, the flange 1688 is moved a greater distance clockwise by the shaft 219 to clear the pin 708 and permit the impression hammer 690 to operate during the second cycle of operation. The impression hammer disabling mechanism being identical with that fully described and illustrated in the Shipley application previously referred to, it is but briefly described herein.

For the purpose of making a legible impression upon the issuing receipts 150 and 151 (Figs. 5 and 6), and also upon the total strip 149 (Figs. 4 and 29), a continuous inking ribbon 714 is provided. This ribbon passes around guide rollers 731 supported by the printer frame and over an inking roller 715 which is mounted upon a stud 716 projecting from the printer plate. The inking ribbon is held taut by a tension roller 717 supported by an arm mounted on a stud 718 projecting from the printer frame.

Secured to the inking roller is a ratchet wheel 709 (Fig. 35) which is engaged by a spring tensioned feed pawl 710 carried by an arm 711 pivoted upon the stud 716. A spring-actuated pawl 712, pivoted on a stud 713, prevents a retrograde motion of the inking roller.

Secured to the arm 711 is a pinion 729 (Fig. 29) which is in mesh with a segment gear lever 730 fulcrumed on a stud 764. This segment gear lever has a pin 732 projecting laterally through an opening in the printer frame to engage with a bifurcated end of a lever 733 (Fig. 25) fulcrumed on a stud 749 and adapted to move clockwise under the influence of a spring 750 and counter-clockwise by the projection 765 on the slide 605.

The inking ribbon is given a short feed and a long feed. The short feed is effective until the joining seam in the ribbon approaches the impression point, when the long feed is effective for one operation of the machine to move the seam past the impression point.

The short feed of the ribbon is controlled by a projection 751 (Fig. 35) on the arm 711 coming into contact with a flat-sided pin 752 carried by a yoke 753 pivoted on the stud 713.

Figure 35:
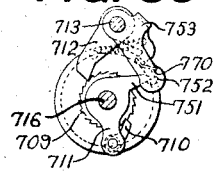
Fig. 35 is a detail view of a portion of the inking ribbon feeding mechanism.

The long feed is controlled by a button 754 fastened on the ribbon 714 (Fig. 29) which engages a flange 770 formed on the yoke 753 (Fig. 35) and rocks the yoke to move the flatsided pin 752 out of the path of the projection 751, allowing the arm 711 to continue its clockwise movement until the pin 732 (Fig. 25) is arrested by the projection 765. During the operation of the machine the slide 605 will restore the feeding arm 711 to the short feed position, as shown in Fig. 35.

There are two buttons 754 attached to the ribbon to cause a long feed as the seam in the ribbon approaches both the upper and lower impression points.

The total record strip 149, which is retained in the machine, is fed from a supply roll 719 (Fig 29) around guide studs 720 and onto a receiving roll 721 which is rotated in a counter-clockwise direction by a spring-pressed pawl 722 carried on a lever 723 which is oscillated by the lever 596 through a link 724. A spring-actuated pawl 725 mounted on a stud 726 prevents retrograde motion of the receiving roll. The lever 596 is limited in its clockwise movement by a pin 727, which forms a stop for arm 728.

The impression is made upon the total record strip by an impression hammer 734 (Figs. 29, 31 and 34) carrying an impression block 735 and pivoted on the rod 664. This impression hammer has a rearwardly extending arm 736 engaging an adjusting screw 737 mounted in a block 738 carried by a lever 739 freely mounted on the rod 664. A spring 740, attached to a pin 741 carried by the impression hammer 734 and to the block 738, normally holds the impression hammer in contact with the adjusting screw and causes the hammer to move counter-clockwise with the lever 739 during a printing operation. The upper end of the lever 739 is normally held in contact with the block 668 by a spring 742 attached to the block 738 and to a pin 743 projecting from the printer frame 572. The lever 739 is moved counter-clockwise against the tension of the spring 742 by a cam 744 secured to the shaft 67 and engaging a roller 745 and the end 746 of the lever 739 during each cycle of operation of the machine. A bracket 747 (Fig. 34) secured to the printer frame 572, overlaps a guide arm 748 secured to the impression hammer 734 to guide the impression hammer during its operation. The guide arm 748 has an upwardly extending arm carrying a pin 749 cooperating with a flange 750 (Fig. 29) to disable the impression hammer when printing items of a multiple-item transaction and also during the first cycle of operation when printing totals. The flange 750 is formed on the same lever as the flange 1688 for disabling the receipt printing hammers. When the impression hammer 734 is disabled, the lever 739 (Fig. 34), which is operated at each operation of the machine, expands the spring 740 without moving the impression hammer, as is also done with the receipt printing hammers previously described.

*Total and sub-total—interlock*

As it is not necessary to press any of the amount keys 91 during a total or sub-total operation, means are provided for preventing their depression when the total lever is out of adding position. As there are no amount keys depressed it is also necessary to render the zero stop pawl 95 (Fig. 7) ineffective in order that the differential mechanism may be controlled by a long tooth 755 of the totalizer pinion 314. The mechanism associated with the long tooth to control the differential mechanism is not shown herein as it is standard, and is shown and described in the patents and application previously referred to.

As above stated, when the total lever 271 is moved either above or below its adding position, the shaft 268 is rocked counter-clockwise (Fig. 7). This shaft has secured thereto a plurality of arms 756 (only one of which is shown in Fig. 7) carrying a rod 757. Counter-clockwise movement of the shaft 268 and arms 756 moves the rod 757 downward in front of a foot 758 integral with an arm 759, which is moved counter-clockwise by the depression of any of the keys 91. With the rod 757 in front of the lower end of the arm 759 it is clear that said arm cannot be rocked counter-clockwise, and therefore none of the keys 91 can be depressed.

If an amount key is depressed, the total lever 271 can be moved by forcing it, but this movement positions a bell crank 760 (Fig. 14), pivoted on the rod 108 and connected by a link 761 to the arm 276, in front of a stud 762 and prevents the machine from being released, as previously described. With an amount key 91 depressed, the arm 759 (Fig. 7) is rocked counter-clockwise and its lower end is moved beneath the rod 757, but there is enough clearance between said arm and said rod to allow the rocking of the bell crank 760 (Fig. 14) to position it in front of the stud 762. When this clearance is taken up, the continued forcing of the lever 271 expands the spring 279 so that the mechanism will not be strained. To release the machine for operation, the total lever must be moved to its adding position and the keys 91 released by partially depressing another key in the same row.

As previously described, the shaft 268 is rocked further clockwise by the mechanism illustrated in Fig. 3, whereupon the rod 757 (Fig. 7) engages the lower ends of the zero stop pawls 95 associated with the amount banks and rocks said pawls clockwise so that their upper ends cannot disconnect the latches at zero.

*Operation*

A very brief description will now be given of an operation wherein an itemized receipt is issued, as illustrated in Fig. 6. Let it be assumed that a " cash " transaction including three separate items is made. The operator positions the totalizing lever 271 in the adding position, as shown in Fig. 1, depressing amount keys 91 representing the value of the first item, which is fifteen cents, the "cash" key of the upper group 97, and the initial key of the clerk, which in this particular transaction is "A", and then the starting key 99, which releases the mechanism, allowing the machine to be operated either by crank 50 or the electric motor. This amount will be entered in the " cash " totalizer and printed upon the receipt 151 (Fig. 6). At the end of an operation, the amount keys will have been returned to normal positions, but the " cash " key and the initial key "A" will remain depressed so that in recording the other two items of the transaction the amount keys and the starting key are depressed. After recording the last item, which in this transaction is twenty cents, the totalizing lever 271 is moved downwardly to the first notch, which is indexed " Item total ". The starting key 99 is depressed and the machine operated. During this totalizing operation, the transaction totalizer cooperates with the actuators to position the type-wheels corresponding to the amount accumulated upon this totalizer, which is the total of the three items entered. This total, which is sixty-five cents, is printed upon the receipt, together with the " cash " character, the initial of the clerk, the name of the merchant and other data, consecutive number, and date, as shown in Fig. 6. At the same time this total amount is printed upon the total strip 149 (Fig. 4). As each item is registered, one will be added in a "cash" item counter and, as the total is printed, one will be added in the "cash" total counter. Also, when the clerk's key "A" is depressed, one is added in clerk A's counter during the totalizing operation of a multiple-item transaction.

When a transaction having but one item is recorded, such as shown on the receipt 150 (Fig. 5), the operation is the same as that for registering a multiple-item transaction, with the exception that the " cash " key of the lower group 98 is depressed with the totalizing lever 271 in the add position.

Single-item transactions of different classifications, as represented by the keys of lower group 98 (Fig 1), are recorded in the same manner as the single-item cash transaction, the only difference being in depressing of the key representing the transaction.

When it is desired to take a sub-total or reading from the classification totalizers, the lever 271 is moved upwardly to the notch index to " Read transaction total ", the classification key 98 is depressed, together with the clerk's key, and the machine operated as before. The amount accumulated on this totalizer will then be printed upon the total record strip 149 and the totalizer still retain this amount at the end of the operation. But should the operator desire to print the total from the classification totalizer and reset the same to zero, he will move the totalizing lever to the lower notch indexed " Reset transaction total ", select the classification totalizer by depressing the key 98, depress the clerk's key, and operate the machine as before.

*Slip printer*

In the modified forms shown in Figs. 36 to 43, the mechanism is substantially the same as that shown in the drawings of the first embodiment, the sales slip 771 (Fig. 43) being substituted for the issuing receipt strip 151 (Fig. 6). Said sales slip is placed upon a table 772 (Fig. 36) and between feeding rollers 773 and 774 which feed the slip toward the rear one space at each operation of the machine, each item being printed upon the slip. The slip is placed in the machine with the top edge toward the rear of the machine. The total of the items of a transaction, together with a character representing the kind of transaction and the initial of the clerk, are printed in the same manner as in the preferred form (Fig. 6) described above, by a totalizing operation.

The slip feeding roller 774 is normally in an ineffective position to permit the insertion of the sales slip between the rollers before the operation of the machine.

The feed roller 774 (Figs. 36, 37 and 38) is freely mounted on a rod 775 supported in a yoke 776 pivoted on a pin 777 on the printer frame 572. The feed roller is retained in normal position against the tension of a spring 778 by a pin 779 projecting from the yoke 776 and engaging a downwardly extending arm 780 on a lever 781 pivoted on the pin 777. The downwardly extending arm 780 carries a spring-tensioned pawl 782 pivoted on a stud 783 and normally held in engagement with a pin 784 by the spring 785. The right hand end of the pawl 782 is formed with a shoulder to engage a pin 790 carried by an oscillating lever 791 freely mounted on a pin 792 supported in the frame. As the lever 791 moves clockwise the lever 781 and feeding roller yoke 776 will be moved counter-clockwise by the spring 778 and place the feeding roller 774 in effective position with its companion roller 773.

The lever 791 is oscillated at each operation of the machine by a spring 793 (Fig. 36) and the slide 605 (Fig. 41). The spring 793 moves the lever 791 clockwise, and the slide 605 moves said lever counter-clockwise by engaging the pin 173 on a lever 794 freely mounted on the telescopic sleeves 576 (Fig. 36). This lever 794 is connected by a link 796 to a lever 797 pivoted on a pin 798 on the printer frame. The upper end of the lever 797 is connected by a link 799 to the lever 791. The elongated opening in the link 796 provides a working clearance around the feeding roller stud 800.

As the lever 791 moves clockwise, the pin 790 will disengage from the shoulder of the pawl 782 and at the same time the lever 781 will be moved counter-clockwise by a spring 801 attached to the lever and to a pin 802 in the printer frame. The lever 781 will move counter-clockwise until the lower end of the arm 780 is arrested by a pin 803 in the printer frame. During this counter-clockwise movement a pin 804 carried by the pawl 782 contacts an arm 805 which causes the pawl to move counter-clockwise on its pivot 783 and elevate the shouldered end of the pawl above the path of the pin 790 so that as the lever 791 returns to normal position the pin 790 will be under the pawl 782, allowing the feeding roller 774 to remain in feeding relation with the upper roller 773. The arm 805 is a part of a cam arm 807 pivoted on the pin 777 and during the item printing operations it is held rigid by a pin 808 carried by a bell crank lever 809 pinned to the rod 219. The pin 808 moves in a cam slot 810 formed in the cam arm 807 during the totalizing operation. As hereinbefore described, the shaft 219 has an initial movement when the total lever is moved from the add to the total position, at which time the pin 808 will move in the portion of the cam slot, which is concentric with the shaft 219, and near the end of the first cycle of the totalizing operation the pin will move through the irregular portion of the cam slot to effect a counter-clockwise movement of the cam arm 807, which carries the lever 781 toward the right, allowing the spring-actuated pawl 782 to return to its normal position, where it will again be engaged by the pin 790, and during the second cycle of operation the lever 781 will be returned to its normal position, with the feeding roller 774 in its normal ineffective position.

During the time the slip feeding roller 774 is in the effective position, the roller 774 is rotated in a clockwise direction at each operation of the machine to move the sales slip one space at a time. Secured to the right hand end of the roller is a gear 815 (Figs. 37 and 38) in mesh with a driving gear 816 freely mounted on the pin 777 and fastened to a ratchet wheel 817 actuated by a spring-tensioned driving pawl 818 pivoted at 819 to an arm 820 freely mounted on the pin 777. A spring-tensioned pawl 821 prevents a retrograde movement of the feeding roller.

The arm 820 is oscillated by a link 822 connecting the arm with the lever 791, previously described.

When the transaction consists of but one item, the feeding roller 774 (Fig. 36) is moved into effective position and returned to normal during a single operation of the machine.

In a single transaction operation the shaft 219 (Figs. 36 and 41) is rocked clockwise by the cam arm 615 under the control of the special keys 98 (Fig. 1), which was fully described in the first embodiment. The shaft 219, being rocked by the cam arm 615, the pin 808 carried by the lever 809 (Fig. 36) will move into the upper end of the slot 810, causing a counter-clockwise movement of this cam arm, which removes the arm 805 from engagement with the pin 804 in the pawl 782, so that as the arm 780 moves in a counter-clockwise direction the shouldered end of the pawl will remain in the plane of the pin 790 carried by the lever 791.

The date and consecutive number at the top of the sales slip are printed by an impression block 822 carried by a hammer 823 (Fig. 36) pivoted on the rod 664 and operated in a similar way to the impression members in the first embodiment. The mechanism for printing the date and consecutive number, other than the impression member, is not shown here, as it is identical with that shown in the Shipley application previously referred to.

An electroplate for printing the data appearing on the sales slip under the date, is secured to a bracket 824 supported by the printer frame cap 656. The impression from this electroplate is made by an impression platen 825 carried by the hammer 823. To prevent a second impression from the electroplate, after the impression of the first item of a multiple-item transaction is made, the hammer 823 is disabled until near the end of the second cycle of the totalizing operation, when it is again restored to normal. This disabling means consists of an arm 826 (Fig. 36) freely mounted on a pin 827 supported by the printer frame. The upper end of this arm has a shoulder 828 which, as the arm moves counter-clockwise will engage a flat sided pin 829 projecting from the impression hammer 823. Secured to the arm 826 is a lever 830 having a spring 831 attached to its right hand end which maintains the left hand end in contact with a pin 832 carried by a lever 833 pivoted on a pin 834 supported by the printer frame. The left hand end of the lever 833 is bifurcated to engage a pin 835 carried by the lever 781. It will be seen that as the lever 781 moves counter-clockwise the lever 833 will move clockwise and the spring-pulled lever 830 counter-clockwise, placing the shoulder 828 under the flat sided pin 829. The right hand end of the lever 833 is bifurcated to engage a member of the consecutive number operating mechanism, not shown here, but hereinbefore referred to.

There are two impression hammers for printing the items and the total on the sales slip. These hammers are loosely mounted on the rod 664 (Fig. 36). Also mounted on this rod is a frame consisting of arms 835, 836 tied together by a rod 837. The arm 835 has a downwardly extending arm carrying a roller similar to the roller 697 which co-operates with a cam similar to the cam 699 to operate the impression hammers through the springs 840, as hereinbefore described in the first embodiment.

The items are printed by the impression hammer 841 (Fig. 39) which carries a pin 842 (Fig. 36) cooperating with the impression hammer 823 to cause a simultaneous operation of these two hammers on the first operation of a transaction.

The item printing hammer operates upon each operation of the machine except during the first cycle of a totalizing operation, when said hammer is disabled by a flanged lever 843 which cooperates with a pin 844 carried by an arm 845 secured to the impression hammer. The flanged lever 843 is loosely mounted upon the telescopic sleeves 576 and is oscillated by a pin 846 cooperating with the bifurcated end of the lever 809 hereinbefore described.

After the items are printed the item impression hammer 841 cooperates with an impression hammer 839 to print the total. This impression hammer carries two impression blocks 847 and 848 to take impressions from the higher order numeral wheels and the transaction and clerk's wheels.

Impression hammer 839 is disabled during the item printing operations of a multiple-item transaction by a flanged lever 849 cooperating with a pin 850 carried by an arm 851 secured to the impression hammer 839. The flanged lever 849 is secured to the lever 843 previously described.

When it is desired to operate the machine without printing a sales slip, as may happen when taking a sub-total or grand total from the various totalizers, the lower impression hammers 823, 841 and 839 are disabled by a manually operated device which is similar to that of the first embodiment. Referring to Fig. 40, this device is shown with the various parts in normal positions, with the manipulative lever 652 pivoted at 653 and having a camming edge engaging a roller 852 carried on a yoke 853 pivoted on a pin 854. Attached to one side of the yoke is a spring 855 which maintains the roller 852 in engagement with the lever 652. The opposite side 856 of the yoke is bifurcated to engage a pin 857 projecting from a lever 858 pivoted on the telescopic sleeves 576. This lever has a flange 859 adapted to engage notches in the two arms 845 and 851 and disable the lower impression hammers when the lever 652 is moved clockwise to its operated position.

In the modified form the total record strip 149 is placed above the type printing wheels. Impressions are made upon this strip by a platen 867 carried by an impression hammer 868 pivoted on the stud 657. This arm is normally held in contact with an adjustable screw, mounted in a block 869, by a spring 870. The block 869 is carried by an oscillating lever 871 pivoted on the stud 657. The oscillating lever has a downwardly extending arm 872 having an elongated opening engaging a pin 873 carried by the lever 696 fulcrumed on the rod 664. A spring 874 normally holds the lever 696 in engagement with the block 668 secured to the printer frame.

The lower end 698 of the lever 696 and roller 697 co-operate with the cam 699 to operate the upper impression hammer in a similar way to that fully described in the first embodiment.

During the time of printing items of a multiple-item transaction, the impression hammer 868 is disabled by the flanged lever 849 cooperating with a pin 874 projecting laterally from a plate 875 secured to the impression hammer 868. This impression hammer is released for operation near the end of the first cycle of the totalizing operation by the rocking of the shaft 219 to move the flanged lever counter-clockwise, as hereinbefore described. During the second cycle of the totalizing operation this impression hammer will print the total on the record strip 149 (Figs. 4 and 36).

The total record strip 149 (Fig. 4) is fed from a supply roll 876 around guide studs 877 and onto a receiving roll 878 freely mounted on a stud 879 supported in the printer frame. The strip is wound around the roll by a spring-pressed pawl 880 cooperating with a ratchet wheel 881 secured to the roll 878. A spring-pulled pawl 882 prevents a retrograde motion to said receiving roll.

The pawl 880 is carried on a three arm lever 883 pivoted on the stud 879, and moved clockwise by a spring 884. Pivotally mounted on one arm of the lever 883 is a link 885 extending downwardly to engage a pin 886 carried by the lever 794. As the lever 794 moves clockwise during a single item registration and also when totalizing, the spring 884 will cause the ratchet pawl lever 883 to move clockwise, and when the lever 794 is returned to normal position by mechanism hereinbefore described, the ratchet pawl 880 will move the ratchet wheel counter-clockwise and move the record strip 149.

A pin 887 projecting from the printer frame projects into an elongated opening 888 in the link 885 to guide the lower end of said link.

A link 889 pivoted to another arm of the ratchet pawl lever 883, carries a flat sided pin 890 in its lower end to cooperate with an arm 891 secured to the impression hammer 868 to disable the record strip feeding mechanism during the registering of the items of a multiple-item transaction.

The link 889 has an opening 892, the left hand side of which contacts a pin 893 supported by the printer frame. The link is normally held in contact with the pin 893 by a spring 894. The sides of the opening 892 are formed so as to cause the link 889 to move on its pivot in a clockwise direction as it is carried upwardly by the three-armed lever 883 so as to be out of the path of the impression hammer arm 891 when said impression hammer is released to make the impression. After the impression is made, the record strip feeding mechanism is operated, which simultaneously returns the link 889 to its normal position.

A section of the printed record strip is visible through an opening 895 in the casing 896 and is protected by transparent material 897.

The inking ribbon mechanism is substantially the same as that shown and described in the first embodiment except the ribbon 714 is guided around the type printing wheels by two shields 898 and 899.

Referring to Fig. 42, which shows a modified form of the clerk's key release, the detent 164 has a projection 905 which cooperates with a flexible pawl 906 pivotally mounted at 907 to a bell crank 908 pivoted on the shaft 219. A spring 909 normally retains the pawl 906 in contact with a pin 910 projecting from the bell crank 908.

In single-item registrations and totalizing operations, the bell crank 908 is moved counter-clockwise to place the flexible pawl 906 below the projection 905, after which the bell crank is moved clockwise to normal position to move the latch plate and release the depressed key.

The bell crank 908 is oscillated by a link 911 the upper end of which is pivotally connected to the bell crank and the lower end to a yoke 912 (Fig. 41) pivoted on a pin 913 supported in the printer frame. The left hand side of the yoke 912 is bifurcated to embrace a pin 914 which projects through an opening in the printer frame and is carried by the lever 781 (Fig. 36), which is hereinbefore described.

While the forms of mechanism herein shown and described are admirably adapted to fulfill the objects primarily stated, it is to be understood that it is not intended to confine the invention to the forms or embodiments herein disclosed, for they are susceptible of embodiment in various forms all coming within the scope of the claims which follow.

What is claimed is:

1. In a machine capable of printing single item transactions and multiple item transactions with total, a plurality of keys, a type carrier adapted to be adjusted by said keys, means for retaining said keys depressed, manipulative means for controlling the machine for single item and multiple item transactions, means under control of said manipulative means for rendering said retaining means ineffective during single item transaction entry operations, said retaining means adapted to remain effective during multiple item transaction entry operations, and means for preparing the machine for printing a total of multiple items printed and for rendering said retaining means ineffective.

2. In a machine capable of registering single and multiple item transactions, a plurality of depressible keys, means for retaining a depressed key in such position, a printing mechanism involving means for feeding a record strip, means for controlling said feeding means to feed the strip a short extent during certain operations and larger extents during other operations, and means operated by an element of said feeding means during long feed operations to move said retaining means to release said depressed key.

3. In a machine capable of issuing printed checks for single item and multiple item with total transactions, an adjustable type carrier, means for locking the type carrier in adjusted position, check issuing mechanism and means operated by the check issuing mechanism for releasing the type carrier.

4. In a machine capable of printing and issuing single item and multiple item with total receipts, a type carrier, an adjustable means for retaining the same in adjusted position, means for preparing the machine to issue a single item receipt and to disable said retaining means, means for preparing the machine to print the items of a multiple item transaction and to control the retaining means whereby it remains effective, and means for preparing said machine to print the total of said items and issue a multiple item with total receipt and to disable said retaining means.

5. In a machine of the class described, the combination of a plurality of depressible keys, a record material feeding means, a type carrier adapted to be differentially positioned by said keys, means for retaining a depressed key in such position, and means operated by said record material feeding means for releasing said depressed key.

6. In a machine of the class described, the combination of a plurality of depressible keys, a record strip, means adapted to feed said record strip variable amounts, means for retaining a depressed key in such position, and means operated by said record strip feeding means for releasing said key only when said record strip is fed one of said variable amounts.

7. In a machine of the class described, the combination of a depressible key, a record strip feeding means adapted to operate different extents, means for retaining said key in a depressed position while operating said feeding means one extent, and means for releasing said key when operating said feeding means another extent.

8. In a machine of the class described, a plurality of keys, type carriers adapted to be adjusted thereby, means for retaining the keys in depressed position, a printing mechanism involving feeding means for giving long and short feeding movements to record material, means for controlling said feeding means to give the material a long feed, and means actuated by said feeding means during a long feeding movement for moving said retaining means to ineffective position.

9. In a machine of the class described, a plurality of keys, type carriers adapted to be adjusted thereby, means for retaining the keys in depressed position, a printing mechanism involving feeding means for giving long and short feeding movements to record material, total controlling means for controlling said feeding means to give the material a long feed, and means actuated by said feeding means during a long feeding movement for moving said retaining means to ineffective position.

10. In a machine for printing items during single cycles of operation and a total thereof during a two-cycle operation, a plurality of keys, retaining means therefor operable upon depression of a key and effective during a plurality of single cycle item printing operations, and means for moving said retaining means to ineffective position during the second cycle of a total printing operation.

11. In a machine capable of printing single item transactions and individual items of a multiple item transaction during single cycles of operation and a total of a multiple item transaction during two cycles of operation; means for controlling the machine for single and two cycle operations; a plurality of keys; retaining means therefor; and means under control of said controlling means for disabling said retaining means during two cycle operations, said retaining means being rendered ineffective during single cycle operations during which single item transactions are printed, said retaining means also being effective during single cycle operations during which an item involved in a multiple item transaction is printed.

12. In a machine capable of printing multiple item transactions including items of unlike values and totals thereof, a printing element, keys for adjusting the same, means for retaining said keys depressed, means for releasing said keys, manipulative means for controlling the machine for printing such multiple item transactions and for preventing an operation of said releasing means, and other manipulative means for preparing the machine to print the total of such unlike items and for causing an operation of said releasing means irrespective of the control effect of said first manipulative means.

13. In a machine capable of printing single item transactions and multiple item transactions, keys for controlling the machine during operations effecting printing of single item transactions and multiple item transactions, a set of keys, type therefor, retaining means for the set of keys, means under control of said controlling keys for setting up a control over said retaining means, and a total printing controlling means adapted to set up a control over said retaining means, superseding the control set up by said controlling keys.

14. The combination of a depressible key, a counter, operating means therefor, driving means for said operating means, a pin and slot connection between said operating and driving means, a pin on said key, a link pivoted on the pin of said connection and slotted to receive the pin on the key, a movable obstruction adapted in one position to cooperate with the slotted end of the link to render said pin and slot connection operable as a driving connection and in another position to render it ineffective as a driving connection, and a total printing control means for controlling the position of said obstruction.

15. The combination of a depressible key, a counter, operating means therefor, driving means for said operating means, a pin and slot connection between said operating and driving means, a pin on said key, a link pivoted on the pin of said connection and slotted to receive the pin on the key, a movable obstruction adapted in one position to cooperate with the slotted end of the link to render said pin and slot connection operable as a driving connection and in another position to render it ineffective as a driving connection, a bank of keys for controlling the position of said obstruction, and a total printing controlling means for superseding the control of the position of the obstruction exercised by the bank of keys.

16. In a machine capable of accumulating single item transactions and multiple item transactions and printing totals thereof, the combination of single item and multiple item transaction keys, means effective upon depression of a multiple item transaction key for locking the key depressed during a plurality of operations, a total control means for preparing the machine to print totals, and means controlled thereby for moving said locking means to ineffective position.

17. In a machine capable of accumulating single item transactions and multiple item transactions and printing totals thereof, the combination of single item and multiple item transaction keys, means effective upon depression of a multiple item transaction key for locking the key depressed during a plurality of operations, a total control means for preparing the machine to print totals, means controlled thereby for moving said locking means to ineffective position, a differentially movable actuator under control of said keys, and means on said actuator for restraining said locking means against moving into effective position while said actuator is in home position.

18. In a machine capable of accumulating items of a multiple item transaction and printing a total thereof, the combination of a multiple item transaction key, means for holding the key depressed, locking means for said holding means, a differentially movable actuator controlled by said key, and means on said actuator preventing an operation of said locking means prior to movement thereof but ineffective to cooperate with said locking means subsequently thereto during accumulating operations, and means functioning during total printing operations to move said locking means into a position to be engaged by said preventing means.

19. In a machine capable of accumulating items of a transaction and printing totals thereof, a key for controlling the machine to accumulate such items, locking means operable to prevent release of said key prior to a total printing operation, and means operable during a total printing operation to move said locking means to unlocking position.

20. In a machine capable of accumulating items of a transaction and printing totals thereof, a key for controlling the machine to accumulate such items, locking means operable to prevent release of said key prior to a total printing operation, means operable during a total printing operation to move said locking means to unlocking position, and a differentially movable actuator for holding said locking means in unlocking position until again released during a subsequent operation of the machine.

21. In a machine capable of accumulating items and printing a total thereof, the combination of single item and multiple item transaction control keys, manually releasable means for retaining said keys depressed, a lock for preventing an operation of said manually releasable means during the accumulation of items of a multiple item transaction, said lock being ineffective during accumulation of single item transactions, and a total control means adapted to control the machine to move the lock into unlocking position to permit the retaining means to be manually released.

22. The combination of two sets of type elements, two impression means co-operable therewith, a bank of keys for controlling the impression means to cause one impression means to co-operate with one set of type elements and to cause both impression means to cooperate with both sets of type elements, and a total control means for causing both impression means to co-operate with both sets of type elements.

23. In a machine capable of printing items and totals thereof, a plurality of type elements, two impression means one of which is adapted to co-operate with some of said type elements, both of the impression means being adapted to jointly cooperate with all of said type elements, a key for controlling one impression means to print from some of said type elements, and a total control means for controlling both impression means to jointly print from all of said type elements.

24. In a machine capable of printing items and totals thereof, a plurality of type elements, two impression means one of which is adapted to co-operate with some of said type elements, both of the impression means being adapted to jointly cooperate with all of said type elements, a key for controlling said impression means to print from some of said type elements, another key for controlling both impression means to jointly print from all of said elements, and a total control means superseding the control of said keys and controlling the impression means to jointly take an impression from all of said type elements.

25. In a machine capable of one-cycle item printing and two-cycle total printing operations, type elements, two impression means co-operable therewith, a key for controlling the impression means to jointly print from all of said type elements on item printing operations, a key for controlling one impression means to print from fewer type elements also in item printing operations, means for controlling the machine for two-cycle operations, means operated by said controlling means for disabling said impression means during the first cycle of a total printing operation, and means controlled by said controlling means to release said impression means for jointly printing from all of said type elements during the second cycle of total printing operations.

26. In a machine capable of printing and issuing receipts with multiple items and their totals, a key depressible for controlling the printing of the multiple items on a receipt, and means controlled by said key for compelling the printing of a total and the issuance of receipt prior to the release of said key.

27. The combination of a feeding mechanism adapted to feed a record strip variable extents, a differentially movable member, and a cam member driven from said differentially movable member for controlling the length of feed.

28. The combination of an oscillating feed actuating member movable variable extents, a stop for controlling the extent of movement of said member, a cam for controlling the position of said stop, and a bank of keys for controlling said cam.

29. The combination of single item and multiple item transaction keys, means for feeding record material variable extents, and means controlled by said keys for controlling the feeding means to feed the record material short extents when a multiple item transaction key is depressed and greater extents when a single item transaction key is depressed.

30. The combination of single item and multiple item transaction keys, means for feeding record material variable extents, and a cam controlled by said keys for controlling the feeding means to feed the record material short extents when a multiple item transaction key is depressed and greater extents when a single item transaction key is depressed.

31. The combination of a variable feeding means, control means, a spring operating upon said control means to cause the feeding means to feed a short extent, and a cam member for controlling the position of said control means in conjunction with said spring.

32. The combination of a variable feeding means, means constantly urged into position to control the feeding means to feed a short extent, a cam member for controlling the position of said control means in conjunction with said spring, and a bank of keys for controlling the position of said cam member.

33. The combination of a variable feeding means, a pivoted stop arm for controlling said means, a plurality of cam arms operatively connected to said stop arm to position the same, and separate manipulative means for controlling the position of said stop arm through said cam arms.

34. The combination of a variable feeding means, a pivoted stop arm for controlling said means, a plurality of cam arms operatively connected to said stop arm to position the same, a bank of keys for controlling said stop arm through one of said cam arms, and a total control lever for controlling said stop arm through another of said cam arms.

35. The combination of a variable feeding means, a pivoted stop arm for controlling said means, a plurality of cam arms operatively connected to said stop arm to position the same, a bank of keys for controlling said stop arm through one of said cam arms, a total control lever for controlling said stop arm through another of said cam arms, and means operated by the total control lever for preventing said first cam arm from being effective.

36. The combination of a variable feed means, a movable stop for controlling said means, a pivoted member operatively connected to said stop to position the same, a bank of keys, a differentially movable cam member under control of said keys, a second pivoted member, a roller thereon co-operating with said cam member, and movable means for moving said pivoted members relatively to each other and adapted when at rest to prevent relative movement between said members.

37. The combination of a variable feed means, a movable stop for controlling said means, a pivoted member operatively connected to said stop to position the same, a bank of keys, a differentially movable cam member under control of said keys, a second pivoted member, a roller thereon co-operating with said cam member, a total lever for preparing the machine for total-taking operations, and means operated thereby for moving said pivoted members relatively to each other to move the roller out of co-operative relation with respect to said cam member.

38. The combination of variable feeding means adapted after an accumulating operation to remain controlled for long or short feeding operations, and means for controlling the feeding means for a long feed during total-taking operations notwithstanding the control set up during accumulating operations.

39. The combination of variable feeding means adapted after an accumulating operation to remain controlled for long or short feeding operation, and means for controlling the machine for total-taking operations directly operable to cause the feeding means to give a short feed and controlling said feeding means to give a long feed.

40. The combination of a variable feeding means, a pivoted stop arm for controlling said means, a plurality of cam arms operatively connected to said stop arm to position same, a bank of keys for controlling said stop arm through one of said cam arms, and total control means for controlling said stop arm through another of said cam arms.

41. In a machine capable of registering single-item transactions and multiple item transactions; a bank of keys for controlling the machine for performing such registrations; means to control the machine to take the total of the several items of a multiple-item transaction; and means for preventing operation of a single-item control key subsequently to an operation of a multiple-item control key and prior to an operation of the total control means.

42. In a machine capable of registering single-item transactions and multiple-item transactions and print the total thereof; single-item control means; multiple-item control means; a total control device to control the machine to print the multiple-item totals; means for retaining said single-item control means in an ineffective position upon operation of the multiple-item control means; and means operable upon operation of the total control device for rendering said retaining means ineffective.

43. In a machine for printing items for single-item transactions, items of multiple-item transactions, and a total of the items of a multiple-item transaction; single-item control keys; multiple-item control keys; multiple-item total control means; retaining means associated with the single-item control keys to prevent operation thereof after the printing of any item of a multiple-item transaction; and means under control of said total control means to render the retaining means ineffective.

44. In a machine capable of accumulating single-item transactions and multiple-item transactions and printing totals thereof, the combination of single-item and multiple-item transaction keys; means effective upon depression of a multiple-item transaction key for locking the single-item keys to prevent operation thereof during a plurality of operations; a total control means for preparing the machine to print totals; and means controlled thereby for moving said locking means into ineffective position.

45. In a machine of the class described, the combination of printing mechanism adapted to print single items and multiple items on an issuing strip, feeding mechanism for the strip, a bank of control keys, and a differentially adjustable member under control of said keys for controlling the feeding means to feed the strip different distances depending on which of the keys is operated.

46. In a machine of the class described, the combination of printing mechanism adapted to print single items and multiple items on an issuing strip, feeding mechanism for the strip, a bank of control keys, and a cam adapted to be adjusted under control of said keys for controlling the feeding means to feed the strip different distances as determined by the key operated.

47. In a machine of the class described, the combination of printing mechanism adapted to print single items and multiple items on an issuing strip, feeding mechanism for the strip, a bank of manipulative devices divided into a plurality of groups, and differentially adjustable means under control of all groups of manipulative devices for controlling the feeding means to feed the strip one distance under control of one group and a different distance under control of another group.

48. In a machine of the class described, the combination of printing mechanism adapted to print single items and multiple items on an issuing strip, feeding mechanism for the strip, a bank of manipulative devices divided into a plurality of groups, and differentially adjustable means under control of all groups of manipulative devices for controlling the feeding means to feed the strip a short distance under control of a certain group of devices and a greater distance under control of another group of devices.

49. In a machine capable of accumulating items of a transaction and printing the total thereof, a key for controlling the machine to accumulate such items, and locking means to prevent manual release of said key prior to a total printing operation.

50. In a machine of the class described, means to accumulate amounts and to take the total thereof, a key adapted, when depressed, to control the machine for such accumulation, and means operated upon entry of the first amount to prevent release of the key prior to a total taking operation.

In testimony whereof I affix my signature.
BERNIS M. SHIPLEY.